United States Patent
Dhanasekaran et al.

(10) Patent No.: US 10,711,920 B2
(45) Date of Patent: Jul. 14, 2020

(54) CLAMPING DEVICE AND AN ASSOCIATED METHOD THEREOF

(71) Applicant: General Electric Company, Schenectady, NY (US)

(72) Inventors: Kesavan Dhanasekaran, Bangalore (IN); Marcus Byron Huffman, Simposonville, SC (US)

(73) Assignee: General Electric Company, Schenectady, NY (US)

( * ) Notice: Subject to any disclaimer, the term of this patent is extended or adjusted under 35 U.S.C. 154(b) by 300 days.

(21) Appl. No.: 15/715,192

(22) Filed: Sep. 26, 2017

(65) Prior Publication Data

US 2018/0087693 A1  Mar. 29, 2018

(30) Foreign Application Priority Data

Sep. 28, 2016  (IN) ............... 201641033106

(51) Int. Cl.
  *F23R 3/60* (2006.01)
  *F16L 3/123* (2006.01)
  (Continued)

(52) U.S. Cl.
  CPC ............ *F16L 3/1233* (2013.01); *B60K 15/01* (2013.01); *F01D 9/023* (2013.01); *F02C 7/22* (2013.01);
  (Continued)

(58) Field of Classification Search
  CPC .......... Y10T 24/1473; Y10T 24/44769; F16L 3/123; F16L 3/1233; F16L 3/1207;
  (Continued)

(56) References Cited

U.S. PATENT DOCUMENTS 622,199 A * 4/1899 Bookhout ............. F16L 3/1207
   248/74.3
1,383,058 A * 6/1921 Atkin ...................... F16L 33/04
   24/281
(Continued)

FOREIGN PATENT DOCUMENTS

CN  1378032 A  11/2002
FR  2909153 A1 * 5/2008 ............ F16L 3/1041

OTHER PUBLICATIONS

S Thiruvarudchelvan, "The potential role of flexible tools in metal forming", Journal of Materials Processing Technology, vol. 122, Issues: 2-3, pp. 293-300, Mar. 28, 2002.

(Continued)

*Primary Examiner* — Gerald L Sung
*Assistant Examiner* — Marc J Amar
(74) *Attorney, Agent, or Firm* — Fletcher Yoder, P.C.

(57) ABSTRACT

Clamping device including sheet metal, wedge-washers, and fastening members. Sheet metal includes first segments and second segment, where each of the first and second segments include conduit-facing end and outwardly-extending end. Conduit-facing ends are joined to each other and wrapped around conduit in opposite directions. Outwardly-extending ends extend in opposite direction to outwardly-extending end. Each outwardly-extending end is bent at bend angle towards a respective conduit-facing end. Wedge-washers are disposed on first and second segments. Each wedge-washer includes sidewall inclined in a direction opposite to bend angle and in contact with a respective outwardly-extending end. Fastening members are disposed on respective wedge-washer.

20 Claims, 15 Drawing Sheets

(51) Int. Cl.

| | | |
|---|---|---|
| *F23R 3/28* | (2006.01) | |
| *F02C 7/22* | (2006.01) | |
| *F16L 3/12* | (2006.01) | |
| *F23R 3/34* | (2006.01) | |
| *F02C 7/32* | (2006.01) | |
| *F16L 3/02* | (2006.01) | |
| *B60K 15/01* | (2006.01) | |
| *F02M 55/02* | (2006.01) | |
| *F16L 3/127* | (2006.01) | |
| *F01D 9/02* | (2006.01) | |

(52) U.S. Cl.
CPC ............... *F02C 7/222* (2013.01); *F02C 7/32* (2013.01); *F02M 55/02* (2013.01); *F16L 3/02* (2013.01); *F16L 3/1207* (2013.01); *F16L 3/127* (2013.01); *F16L 3/1211* (2013.01); *F23R 3/28* (2013.01); *F23R 3/283* (2013.01); *F23R 3/346* (2013.01); *F23R 3/60* (2013.01); *F05D 2260/30* (2013.01); *F23K 2301/20* (2013.01); *Y10T 24/1473* (2015.01)

(58) Field of Classification Search
CPC ......... F16L 3/1211; F16L 3/127; F16L 3/122; F16L 3/02; F16L 3/08; F16L 3/10; F23R 3/346; F23R 3/46; F23R 3/60; F01D 9/023
USPC ............ 285/61, 64, 421; 248/65, 67.7, 74.2, 248/230.6, 231.71
See application file for complete search history.

(56) References Cited

U.S. PATENT DOCUMENTS

| | | | | |
|---|---|---|---|---|
| 1,524,341 | A * | 1/1925 | Davis | F16L 3/00 248/56 |
| 2,053,262 | A * | 9/1936 | Cornell, Jr. | F16L 3/00 248/65 |
| 2,166,916 | A * | 7/1939 | Lombard | F16L 3/13 248/73 |
| 2,340,560 | A | 2/1944 | Rempt | |
| 2,372,674 | A * | 4/1945 | Jordan | F16L 3/1226 248/65 |
| 2,427,883 | A | 9/1947 | Score et al. | |
| 2,432,492 | A | 12/1947 | Tinnerman | |
| 3,232,569 | A * | 2/1966 | Deardorf | F16L 3/1207 248/74.1 |
| 3,301,514 | A * | 1/1967 | Sugaya | F16L 3/1083 248/73 |
| 3,883,206 | A * | 5/1975 | Baughman | H01F 27/06 312/351 |
| 4,153,228 | A * | 5/1979 | Delserro | F16L 3/123 24/19 |
| 4,709,889 | A * | 12/1987 | Erickson | F16L 3/1236 248/74.3 |
| 4,856,739 | A * | 8/1989 | Takikawa | F16L 3/085 248/74.2 |
| 4,930,191 | A * | 6/1990 | Takahashi | F16L 33/03 24/20 CW |
| 4,932,619 | A * | 6/1990 | Usui | F16L 3/123 248/74.1 |
| 5,197,288 | A * | 3/1993 | Newland | F02C 7/222 60/734 |
| 5,271,588 | A | 12/1993 | Doyle | |
| 5,330,139 | A | 7/1994 | Tietje | |
| 5,524,883 | A * | 6/1996 | Allen | A63B 63/083 24/115 F |
| 5,791,148 | A * | 8/1998 | Burrus | F01D 5/18 60/749 |
| 5,934,269 | A | 8/1999 | Wilson | |
| 6,513,767 | B1 * | 2/2003 | Rodgers | F16L 3/1025 24/16 PB |
| 6,523,352 | B1 * | 2/2003 | Takahashi | F01D 9/023 138/103 |
| 7,308,912 | B2 | 12/2007 | Watanabe et al. | |
| 7,661,717 | B2 | 2/2010 | Sakazaki et al. | |
| 8,851,430 | B2 * | 10/2014 | Mulzer | A61J 1/16 248/65 |
| 9,347,337 | B2 * | 5/2016 | Hindle | F01D 25/02 |
| 2005/0279099 | A1 * | 12/2005 | Zborovsky | F01D 9/023 60/752 |
| 2007/0128002 | A1 * | 6/2007 | Geary | F23R 3/002 411/511 |
| 2009/0065659 | A1 * | 3/2009 | Dann | F16L 3/243 248/74.1 |
| 2009/0072099 | A1 * | 3/2009 | Trotter | B60G 21/0551 248/74.1 |
| 2010/0018210 | A1 * | 1/2010 | Fox | F23R 3/16 60/746 |
| 2010/0170254 | A1 * | 7/2010 | Venkataraman | F02C 7/228 60/746 |
| 2012/0097443 | A1 * | 4/2012 | Mazelle | H02G 3/32 174/520 |
| 2014/0306071 | A1 * | 10/2014 | Stechmann | A61J 1/16 248/65 |
| 2015/0113937 | A1 * | 4/2015 | Bleeker | F16L 57/04 60/39.091 |
| 2015/0159877 | A1 * | 6/2015 | Stoia | F02C 7/222 60/735 |
| 2015/0316178 | A1 * | 11/2015 | Patil | F16L 3/2431 248/67.5 |
| 2016/0010764 | A1 * | 1/2016 | Dworak, Jr. | F16L 3/1058 248/72 |
| 2017/0167734 | A1 * | 6/2017 | Cheng | F16L 3/1058 |

OTHER PUBLICATIONS

Indian First Examination Report for IN Application No. 201641033106 dated May 27, 2019; 5 pgs.

* cited by examiner

CLAMPING DEVICE AND AN ASSOCIATED METHOD THEREOF

BACKGROUND OF THE INVENTION

Embodiments of the present disclosure relate to a clamping device, and more specifically, to a clamping device for holding a conduit in a position, for example, to a combustor-can of turbomachines.

Clamping devices are used for holding an object, such as a conduit, disposed on a fixture such as a frame. Conventional clamping devices include at least a bush and a clamp for holding a conduit to the fixture. Typically, the bush is disposed directly over the conduit and the clamp is mounted on the bush and coupled to the fixture. Generally, the bush is made of metal wires to tightly clamp the pipe to the fixture.

During operation of a system, such as a gas turbine system, employing such a clamping device for holding a conduit to a frame, there may be longitudinal or radial movements between contacting surfaces (i.e., interfacing surfaces) of the bush and the conduit. Such movements result in developing a fretting wear at the interfacing surfaces. The fretting wear is a surface damage caused by the movements of two contacting surfaces under the presence of a load. The fretting wear may result in generating wire debris from the bush and retention of such wire debris at the interfacing surfaces, thereby further damaging the bush or the conduit. In such situations, the clamp and/or the bush may need to be replaced during periodic inspection. The conventional clamps used in the gas turbine system have complex geometries and require sophisticated manufacturing capabilities for their production. Similarly, the bush is generally made of expensive thin metal wires. Periodic replacement of such clamps and bushes increase the production costs as well as the service costs. Further, the conventional clamping devices are generally rigid clamping devices, which are not flexible enough to absorb the vibrations of the conduit and/or the frame under the presence of a load. Accordingly, there is a need for an enhanced clamping device for holding a conduit to a frame.

BRIEF DESCRIPTION OF THE INVENTION

In accordance with one example embodiment, a clamping device for clamping a conduit in a position is disclosed. The clamping device includes a sheet metal, a plurality of wedge-washers, and a plurality of fastening members. The sheet metal includes a plurality of first segments and at least one second segment. Each of the plurality of first segments and the at least one second segment include a conduit-facing end and an outwardly-extending end. The conduit-facing ends are joined to each other along a lateral axis of the sheet metal and is configured to wrap around the conduit in opposite directions. The outwardly-extending ends of the plurality of first segments extend in an opposite direction to the outwardly-extending end of the at least one second segment. Each of the outwardly-extending ends is bent at a respective bend angle relative to a longitudinal axis of the sheet metal, towards a respective conduit-facing end of a respective one of the plurality of first segments or the at least one second segment. Wedge-washers are disposed on the plurality of first segments and the at least one second segment, wherein each wedge-washer includes a sidewall that is inclined in a direction opposite to the bend angle and is in contact with a respective outwardly-extending end of the segment or segments secured thereby. At least one fastening member is disposed on each of the plurality of wedge-washers for applying pressure on the respective wedge-washer along radial and longitudinal axes of the sheet metal.

In accordance with another example embodiment, a system such as a turbine assembly is disclosed. The turbine assembly includes a combustor-can and an axial fuel staging (AFS) system coupled to the combustor-can. The AFS system includes a fuel injector and a conduit assembly, where the conduit assembly includes a conduit that is clamped to the combustor-can with a clamping device. In such an embodiment, the clamping device includes a sheet metal, a plurality of wedge-washers, and a plurality of fastening members. The sheet metal includes a plurality of first segments and at least one second segment. Each of the plurality of first segments and the at least one second segment include a conduit-facing end and an outwardly-extending end. The conduit-facing ends are joined to each other along a lateral axis of the sheet metal and is configured to wrap around the conduit in opposite directions. The outwardly-extending ends of the plurality of first segments extend in an opposite direction to the outwardly-extending end of the at least one second segment. Each of the outwardly-extending ends is bent at a respective bend angle relative to a longitudinal axis of the sheet metal, towards a respective conduit-facing end of a respective one of the plurality of first segments or the at least one second segment. Wedge-washers are disposed on the plurality of first segments and the at least one second segment, wherein each wedge-washer includes a sidewall that is inclined in a direction opposite to the bend angle and is in contact with a respective outwardly-extending end of each of the segment or segments secured thereby. At least one fastening member is disposed on each of the plurality of wedge-washers for applying pressure on the respective wedge-washer along radial and longitudinal axes of the sheet metal and thereby clamp the conduit to the combustor-can.

In accordance with yet another example embodiment, a method for clamping at least one conduit to a combustor-can is disclosed. The method involves obtaining a sheet metal including a plurality of first segments and at least one second segment wherein each of the plurality of first segments and the at least one second segment include a conduit-facing end and an outwardly-extending end. The conduit-facing ends are joined to each other along a lateral axis of the sheet metal. The method involves wrapping the conduit-facing ends of each of the plurality of first segments and the at least one second segment of the sheet metal around the conduit in opposite directions and extending the outwardly-extending ends of the plurality of first segments in an opposite direction to the outwardly-extending end of the at least one second segment. The method further involves bending each of the outwardly-extending ends at a respective bend angle relative to a longitudinal axis of the sheet metal, towards a respective conduit-facing end of a respective one of the plurality of first segments or the at least one second segment. Further, the method involves disposing at least one wedge-washer of a plurality of wedge-washers on each of the plurality of first segments and the at least one second segment such that a sidewall of the at least one wedge-washer is in contact with a respective outwardly-extending end of each of the plurality of first segments and the at least one second segment. The sidewall is inclined in a direction opposite to the bend angle. The method further involves disposing at least one fastening member on each of the plurality of wedge-washers for applying pressure on the respective wedge-washer along radial and longitudinal axes of the sheet metal and thereby clamping the at least one fastening member to the combustor-can.

BRIEF DESCRIPTION OF THE DRAWINGS

These and other features and aspects of embodiments of the present disclosure will become better understood when the following detailed description is read with reference to the accompanying drawings in which like characters represent like parts throughout the drawings, wherein.

DETAILED DESCRIPTION

Figure 1:
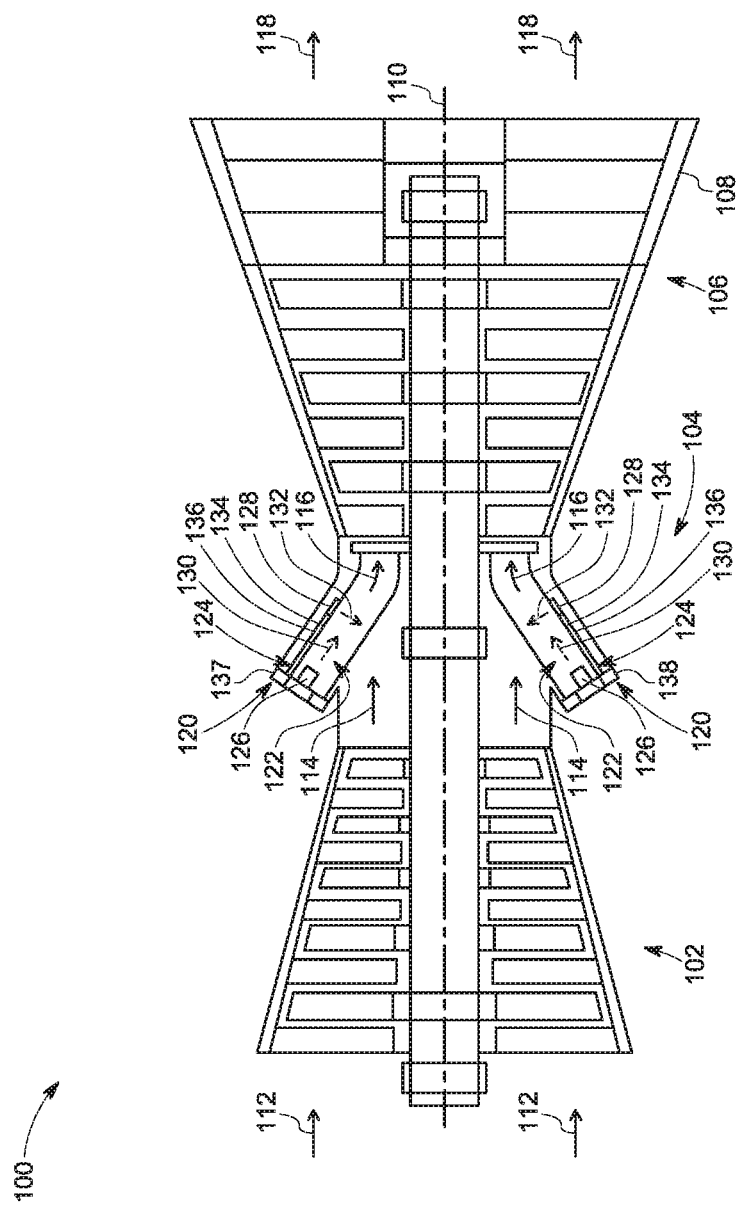
FIG. 1 is a schematic illustration of a turbine assembly in accordance with one example embodiment of the present disclosure.

In the following specification and the claims, the singular forms "a", "an" and "the" include plural referents unless the context clearly dictates otherwise. As used herein, the term "or" refers to at least one of the referenced components being present and includes instances in which a combination of the referenced components may be present, unless the context clearly dictates otherwise. Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value. Unless defined otherwise, technical and scientific terms used herein have the same meaning as is commonly understood by one of skill in the art to which this description belongs. The terms "comprising," "including," and "having" are intended to be inclusive, and mean that there may be additional elements other than the listed elements. The terms "first", "second", and the like, as used herein do not denote any order, quantity, or importance, but rather are used to distinguish one element from another.

To more clearly and concisely describe and point out the subject matter, the following definitions are provided for specific terms, which are used throughout the following description and the appended claims, unless specifically denoted otherwise with respect to particular embodiments. The term "longitudinal axis" as used in the context means an axis that extends lengthwise of a sheet metal. The term "lateral axis" as used in the context means an axis that extends crosswise or widthwise of the sheet metal. The term "radial axis" as used in the context means an axis that extends thickness wise of the sheet metal. The term "conduit-facing end" as used in the context refers to a portion of a segment of the sheet metal that is proximate to a conduit when the conduit is clamped with the clamping device. Upon clamping the conduit using the clamping device of the present disclosure, the conduit facing end of a respective segment of the sheet metal is configured to receive the conduit and loop around the conduit. The term "outwardly-extending end" as used in the context means a portion of a segment of the sheet metal that is disposed away from a conduit when the conduit is clamped with the clamping device. Upon clamping the conduit using the clamping device of the present disclosure, the outwardly-facing end of a respective segment of the sheet metal receives a wedge-washer and a fastening member for holding the conduit to a combustor-can via the sheet metal. The term "unified conduit-facing end" as used in the context means a portion of the sheet metal, wherein a plurality of conduit facing ends are joined together to receive the conduit and loops around the conduit.

Embodiments of the present disclosure discussed herein relate to a clamping device for clamping a conduit in a position. The clamping device includes a sheet metal, a plurality of wedge-washers, and a plurality of fastening members. The sheet metal includes a plurality of first segments and at least one second segment. Each of the plurality of first segments and the at least one second segment include a conduit-facing end and an outwardly-extending end. The conduit-facing ends are joined to each other along a lateral axis of the sheet metal and are configured to wrap around the conduit in opposite directions. The outwardly-extending ends of the plurality of first segments extend in a direction that is opposite to the direction of the outwardly-extending end of the at least one second segment. Each of the outwardly-extending ends is bent at a respective bend angle relative to a longitudinal axis of the sheet metal, towards a respective conduit-facing end of a respective one of the plurality of first segments or the at least one second segment. At least one wedge-washer is disposed on each of the plurality of first segments and the at least one second segment, wherein the at least one wedge-washer includes a sidewall that is inclined in a direction opposite to the bend angle and is in contact with a respective outwardly-extending end of each of the plurality of first segments and the at least one second segment. At least one fastening member is disposed on each of the plurality of wedge-washers for applying pressure on the respective wedge-washer along radial and longitudinal axes of the sheet metal.

In one embodiment, the sheet metal is a flat metal strip. In some other embodiment, a first portion of the sheet metal is in a cylindrical form and a second portion of the sheet metal has the flat form. In such embodiments, the first portion may correspond to a conduit-facing end of the sheet metal and the second portion may correspond to an outwardly-extending end of the sheet metal.

In certain embodiments, the clamping device is configured to hold one or more components of a system such as a turbine assembly. The one or more components may include at least one conduit. In some embodiments, the clamping device is configured to hold at least one conduit, such as a fuel supply conduit or a compressed fluid supply conduit, to a frame such as a combustor-can. In accordance with one or more embodiments of the present disclosure, the clamping device is made of a thin sheet metal. The thin sheet metal may be made of high temperature heat resistance alloy materials such that the clamping device is flexible along a radial axis and/or a longitudinal axis of the sheet metal to hold the conduit. The clamping device having a stiffness in a range from about 1000 N/mm to about 100000 N/mm, for example, is configured to absorb any vibrations of the conduit and/or the combustor-can, under the presence of a load. Further, the sheet metal having a heat resistant metal alloy material is configured to accommodate the thermal expansion of the conduit and/or the combustor-can. The conduit may be easily fastened (or unfastened) to the combustor-can using the clamping device. Further, the clamping device of the present disclosure does not have a conventional clamp and a bush to hold the conduit to the combustor-can and reduces the fretting wear that gets generated due to the relative movement of two contacting surfaces under the presence of the load. Moreover, the clamping device of the present disclosure reduces the materials and manufacturing cost, due to usage of fewer components for holding the conduit to the combustor-can.

In accordance with one example embodiment, a system such as a turbine assembly is disclosed. The turbine assembly includes a combustor-can and an axial fuel staging (AFS) system coupled to the combustor-can. The AFS system includes a fuel injector and a conduit assembly, where the conduit assembly includes a conduit that is clamped to the combustor-can with the clamping device of the present disclosure.

FIG. 1 is a schematic illustration of a turbine assembly 100 in accordance with one example embodiment of the present disclosure. In some embodiments, the turbine assembly 100 is a gas turbine assembly that includes a compressor 102, a combustor 104, and a turbine 106 coupled in flow communication with one another within a casing 108 along a centerline axis 110. In operation, a working fluid (e.g., a compressed air) 112 flows into compressor 102 and is compressed and channeled into combustor 104. Compressed fluid 114 is mixed with a fuel (not shown in FIG. 1) and ignited in the combustor 104 to generate combustion fluid 116 that are channeled into turbine 106 and then discharged from turbine 106 after the work as exhaust fluid 118.

In the example embodiment, the combustor 104 includes a plurality of combustor-cans 120. Each of the plurality of combustor-cans 120 defines a combustion zone 122 into which fuel and compressed fluid 114 are injected via a fuel delivery system (e.g., an axial fuel staging (AFS) system 124). It should be noted herein that for ease of illustration, each of the plurality of combustor-cans 120 is shown to include only one AFS system 124. The AFS system 124 includes a primary fuel injector 126 and a secondary fuel injector 128 positioned axially downstream from the primary fuel injector 126. In one embodiment, the primary fuel injector 126 is coupled to a casing flange 137 that supports combustor-cans 120. The casing flange 137 includes at least one conduit assembly (not shown) configured to supply a first mixture 130 of the fuel and the compressed fluid 114 to the primary fuel injector 126. Further, the primary fuel injector 126 is configured to inject the first mixture 130 into combustion zone 122. In one embodiment, the secondary fuel injector 128 is coupled to a sleeve assembly 134 that defines part of combustion zone 122. Further, the secondary fuel injector 128 is supplied with a second mixture 132 of the fuel and the compressed fluid 114 via a conduit assembly 136. In one embodiment, the conduit assembly 136 may include one conduit (not shown) for supplying fuel, another conduit (not shown) for supplying the compressed fluid 114, and a mixing unit (not shown) for mixing the fuel and the compressed fluid 114. Further, the secondary fuel injector 128 is configured to inject the second mixture 132 into combustion zone 122. In other embodiments, the turbine assembly 100 may have any other suitable arrangement of the second fuel injector and the conduit assembly 136 for supplying the second mixture 132 of the fuel and the compressed fluid 114 without deviating from the scope of the present disclosure.

Figure 2:
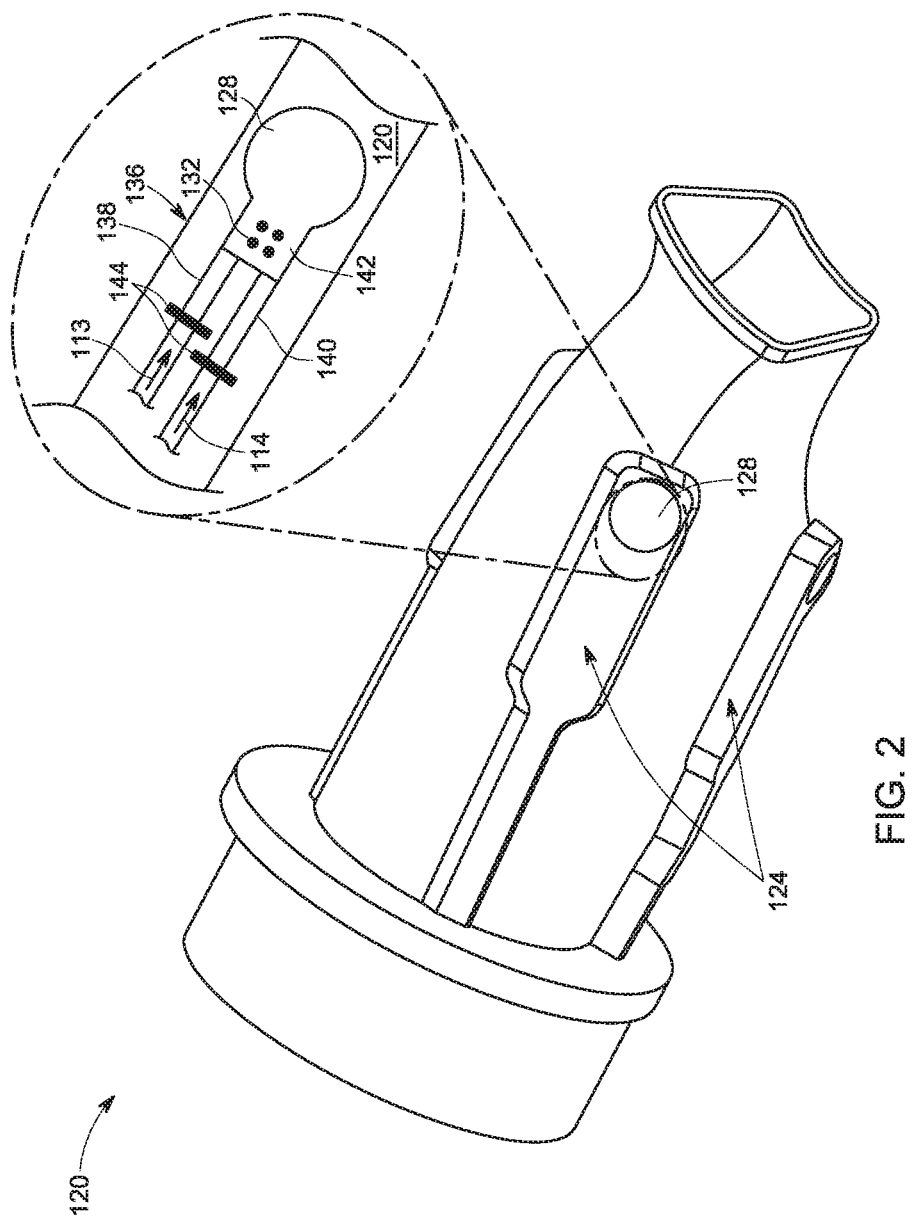
FIG. 2 is a perspective view of a combustor-can and an axial fuel staging (AFS) system of a turbine assembly in accordance with the example embodiment of FIG. 1.

FIG. 2 is a perspective view of a combustor-can 120 and a plurality of AFS systems 124 in accordance with the example embodiment of FIG. 1. The AFS systems 124 are spaced apart from each other along a circumferential direction of the combustor-can 120 and are coupled to the combustor-can 120. In one example embodiment, a conduit assembly 136 is used for supplying fuel 113 and compressed fluid 114 to the secondary fuel injector 128 of a respective AFS system 124. The conduit assembly 136 includes a first conduit 138, a second conduit 140 positioned adjacent to the first conduit 138, and a mixing unit 142. The first and second conduits 138, 140 are disposed on the combustor-can 120 and extend along a lateral direction of the combustor-can 120. In some other embodiments, the second conduit 140 may be disposed within the first conduit 138. In the illustrated embodiment, the first and second conduits 138, 140 are coupled to the secondary fuel injector 128 via the mixing unit 142. In one embodiment, the first conduit 138 is configured to supply the fuel 113 and the second conduit 140 is configured to supply the compressed fluid 114. In certain embodiments, the mixing unit 142 is configured to mix the fuel 113 and the compressed fluid 114 and generate the second mixture.

The primary fuel injector 126 (as shown in FIG. 1) is configured to inject the first mixture 130 into combustion zone 122 and the secondary fuel injector 128 is configured to inject the second mixture 132 into combustion zone 122. Specifically, the first mixture 130 is injected upstream from the second mixture 132, into the combustion zone 122. The first and second mixtures 130, 132 are then ignited inside combustion zone 122 to generate combustion fluid 116 that flow downstream into turbine 106.

In one example embodiment, each of the first and second conduits 138, 140 is coupled to the combustor-can 120 via a respective clamping device 144 (as shown in FIG. 2). In one embodiment, the clamping device 144 includes a sheet metal, a plurality of wedge-washers, and at least one fastening member. Such a clamping device 144 of the present disclosure is discussed in greater detail below.

During operation, the conduits 138, 140 and the combustor-can 120 may be subjected to vibrations due to the presence of load such as a flow of the fuel 113, a flow of the compressed fluid 114, and the rotation of a shaft along the centerline axis 110. The vibrations may get transferred from the combustor-can 120 to the conduit or vice versa. In one embodiment, the clamping device 144 of the present disclosure is flexible along radial and longitudinal axes of the sheet metal, thereby absorbing the vibrations. Further, the clamping device 144 do not uses bush for holding the conduits 138, 140 with tight clearance, thereby reducing the occurrence of a fretting wear between contacting surfaces of the clamping device 144 and the respective conduits 138, 140.

Figure 3:
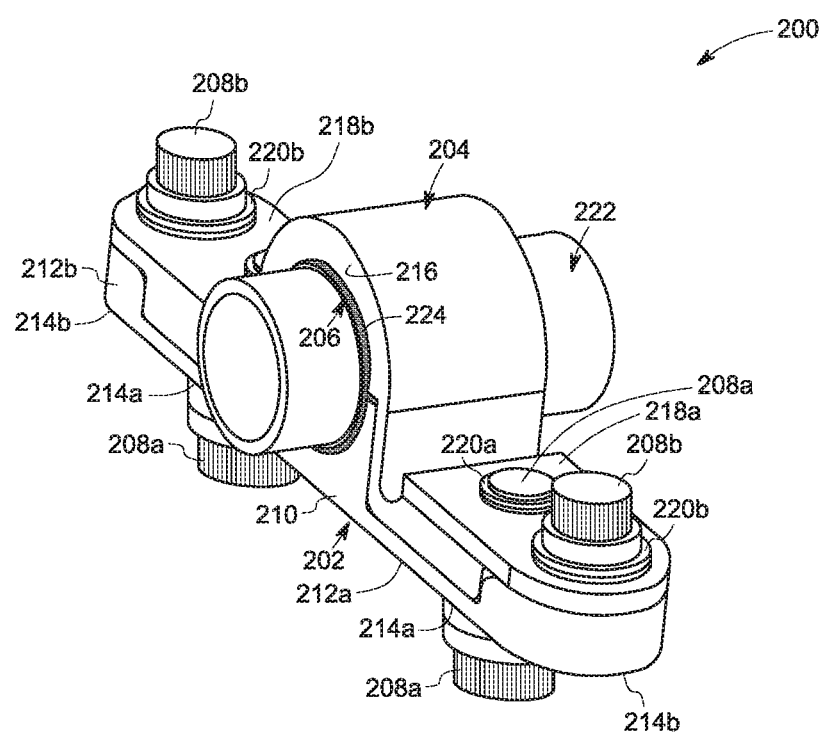
FIG. 3 is a perspective view of a conventional clamping device.

FIG. 3 is a perspective view of a conventional clamping device 200. The illustrated conventional clamping device 200 includes a first half clamp portion 202, a second half clamp portion 204, a bush 206, a first set of bolts 208a, and a second set of bolts 208b. The first half clamp portion 202 includes a conduit-receiving portion 210 and protruding portions 212a, 212b. The first half clamp portion 202 further has a first set of holes 214a and a second set of holes 214b formed in the protruding portions 212a, 212b. Similarly, the second half clamp portion 204 includes another conduit-receiving portion 216 and protruding portions 218a, 218b. The second half clamp portion 204 further has a third set of holes 220a and a fourth set of holes 220b formed in the protruding portions 218a, 218b.

The first half clamp portion 202 is disposed on a frame (not shown). The bush 206 is disposed on an inner surface of the conduit-receiving portion 216. A conduit 222 is inserted through the bush 206. The second half clamp portion 204 including the bush 206 and the conduit 222 is disposed over the first half clamp portion 202. The second set of bolts 208b is disposed along the fourth set of holes 220b and the second set of holes 214b to fasten the second half clamp portion 204 to the first half clamp portion 202. Further, the first set of bolts 208a is disposed along the third set of holes 220a and the first set of holes 214a to fasten the conventional clamping device 200 to the frame.

The conventional claiming device 200 configured to hold the conduit 222 may experience a fretting wear and thereby result in generation of wire debris from the bush 206 and retention of such wire debris at an interfacing surface 224 of the bush 206 and the conduit 222, which may result in damaging at least one of the bush 206 or the conduit 222. In such situations, the clamping device 200 and/or the bush 206 may need to be replaced during a periodic inspection.

Figure 4:
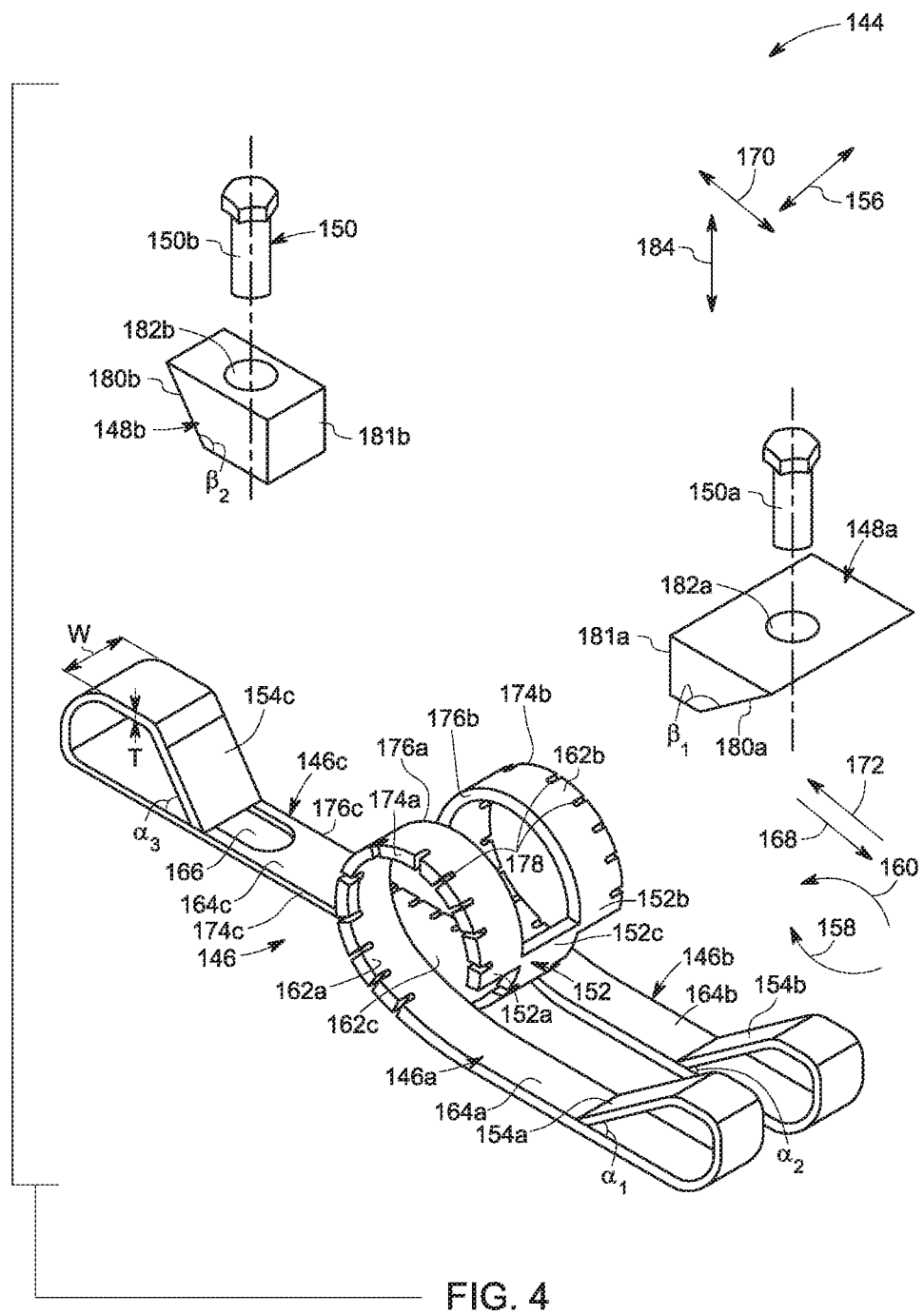
FIG. 4 is an exploded perspective view of a clamping device in accordance with one example embodiment of the present disclosure.

FIG. 4 is an exploded perspective view of a clamping device 144 in accordance with one example embodiment of the present disclosure. The clamping device 144 includes a sheet metal 146, a plurality of wedge-washers 148a, 148b, and at least one fastening member 150. In the illustrated embodiment, the clamping device 144 includes a plurality of fastening members 150a, 150b.

The sheet metal 146 includes a plurality of first segments 146a, 146b and at least one second segment 146c. In the illustrated embodiment, the at least one second segment 146c is disposed between the plurality of first segments 146a, 146b. In some other embodiments, the sheet metal 146 may include a plurality of second segments inter-disposed between the plurality of first segments 146a, 146b. Each of the plurality of first segments 146a, 146b includes a respective conduit-facing end 152a, 152b and a respective outwardly-extending end 154a, 154b. The at least one second segment 146c includes a conduit-facing end 152c and an outwardly-extending end 154c. In one embodiment, the conduit facing ends 152a, 152b, 152c and the outwardly-extending ends 154a, 154b, 154c are mutually opposite ends of a respective segment 146a, 146b, 146c of the sheet metal 146.

In one embodiment, the conduit-facing ends 152a, 152b of each of the plurality of first segments 146a, 146b are integrated to the conduit-facing end 154c of the at least one second segment 146c via use of a single piece of sheet metal to form a unified conduit-facing end of the sheet metal 146. Specifically, the conduit-facing ends 152a, 152b, 152c are joined to each other along a lateral axis 156 of the sheet metal 146 to form the unified conduit-facing end 152 of the sheet metal 146.

In one embodiment, the first segment 146a includes a first portion 162a located proximate to the conduit-facing end 152a and a second portion 164a located proximate to the outwardly-extending end 154a. The first segment 146b includes a first portion 162b located proximate to the conduit-facing end 152b and a second portion 164b located proximate to the outwardly-extending end 154b. Similarly, the at least one second segment 146c includes a first portion 162c located proximate to the conduit-facing end 152c and a second portion 164c located proximate to the outwardly-extending end 154c. The at least one second segment 146c further has an elongated hole 166 disposed in the second portion 164c. The elongated hole 166 is a through-hole and may include threads. In such embodiments, the elongated hole 166 is configured to receive the fastening member 150b along a radial axis 184 of the sheet metal 146 and slide the fastening member 150b along a longitudinal axis 170 of the sheet metal 146.

In one embodiment, the conduit-facing ends 152a, 152b and the conduit facing end 152c are configured to wrap around a conduit (not shown in FIG. 4) in opposite directions. Specifically, the first portion 162a, 162b and the first portion 162c are configured to wrap around the conduit in the opposite directions. In one or more embodiments, the opposite directions 158, 160 includes clockwise direction 158 and counter clockwise direction 160.

The outwardly-extending ends 154a, 154b of the plurality of first segments 146a, 146b extend in an opposite direction to the outwardly-extending end 154c of the at least one second segment 146c. Specifically, the outwardly-extending ends 154a, 154b extend in a first direction 168 along the longitudinal axis 170 and the outwardly-extending end 154c extends in a second direction 172 along the longitudinal axis 170. Further, each of the outwardly-extending ends 154a, 154b, 154c is bent at a respective bend angle "$\alpha_1$", "$\alpha_2$", "$\alpha_3$" relative to the longitudinal axis 170, towards a respective conduit-facing end 152a, 152b, 152c. In one embodiment, each bend angle "$\alpha_1$", "$\alpha_2$", "$\alpha_3$" is in a range from about 15 degrees to about 50 degrees. In a more specific example, each bend angle "$\alpha_1$", "$\alpha_2$", "$\alpha_3$" is in a range from about 20 degrees to about 45 degrees. In one embodiment, each bend angle "$\alpha_1$", "$\alpha_2$", "$\alpha_3$" is at 30 degrees. In another embodiment, each bend angle "$\alpha_1$", "$\alpha_2$", "$\alpha_3$" is at 45 degrees.

In one embodiment, each of the plurality of first segments 146a, 146b includes a respective first side 174a, 174b and a respective second side 176a, 176b. Similarly, the at least one second segment 146c includes a first side 174c and a second side 176c. In some embodiments, at least one side 174a, 174b, 174c of each of the plurality of first segments 146a, 146b and at least one second segment 146c includes a plurality of slits 178 spaced apart from each other. In some embodiments, the slits 178 are spaced apart along the longitudinal axis 170. In one embodiment, at least one side of each of the plurality of first segments 146a, 146b or at least one second segment 146c include the plurality of slits 178, which are spaced apart from each other. In the illustrated embodiment, the first side 174a of the first segment 146a includes the plurality of slits 178 and the first side 174b of the first segment 146b includes the plurality of slits 178. The first side 174c and/or the second side 176c of the at least one second segment 146c includes the plurality of slits 178. In one or more embodiments, the plurality of slits is configured to reduce the risk of cracking and provide substantially high degree of flexibility to the sheet metal 146. In some other embodiments, each of the plurality of first segments 146a, 146b and at least one second segment 146c include a plurality of slits 178, which are spaced apart from each other. In some other embodiments, each of the plurality of first segments 146a, 146b and the at least one second segment 146c may not include the plurality of slits 178, depending on the application and design criteria.

In one embodiment, the sheet metal 146 is made of a high temperature heat resistant metal alloy material such as a cobalt-chromium-tungsten-nickel alloy or a nickel-based super alloy, for example, an Inconel alloy. The term "high temperature" as used in the context refers to a temperature in a range from 1100 degrees Fahrenheit to 2100 degrees Fahrenheit. In one or more embodiments, the cobalt-chromium-tungsten-nickel alloy material or the nickel-based super alloy has a high-temperature strength and oxidation resistance at about 1500 degrees Fahrenheit to about 2000 degrees Fahrenheit. Further, in some embodiments, each of the plurality of first segments 146a, 146b and the at least one segment 146c has a thickness "T", which may be in a range from about 3 mm to about 5 mm. Similarly, in some embodiments, the each of the plurality of first segments 146a, 146b and the at least one segment 146c has a width "W", which may be in a range from about 30 mm to about 50 mm.

In one embodiment, each of the plurality of wedge-washers 148a, 148b includes a respective sidewall 180a, 180b. The sidewall 180a is inclined at an angle "$\beta_1$" in a direction opposite to the bend angle "$\alpha_1$", "$\alpha_2$" of each of the plurality of first segments 146a, 146b. The sidewall 180b is inclined at an angle "$\beta_2$" in a direction opposite to the bend angle "$\alpha_3$" of the at least one second segment 146c. In one embodiment, each angle "$\beta_1$", "$\beta_2$" is in a range from about 130 degrees to about 165 degrees. In a more specific example, each angle "$\beta_1$", "$\beta_2$" is in a range from about 135 degrees to about 160 degrees. In one embodiment, the angle "$\beta_1$" is a mutually complementary angle to each bend angle "$\alpha_1$", "$\alpha_2$". Similarly, the angle "$\beta_2$" is a mutually complementary angle to the bend angle "$\alpha_3$". In one embodiment, each angle "$\beta_1$", "$\beta_2$", "$\beta_3$" is at 145 degrees. In another embodiment, each angle "$\beta_1$", "$\beta_2$", "$\beta_3$" is at 160 degrees.

In one embodiment, the wedge-washer 148a is configured to be disposed over the second portions 164a, 164b of the plurality of first segments 146a, 146b. Similarly, the wedge-washer 148b is configured to be disposed over the second portion 164c of the at least one second segment 146c. The wedge-washer 148a has a hole 182a disposed between the sidewalls 180a, 181a and the wedge-washer 148b has a hole 182b disposed between the sidewalls 180b, 181b. In certain embodiments, the holes 182a, 182b are through-holes and may include threads. In the illustrated embodiment, each of the plurality of fastening members 150a, 150b is a bolt. In such embodiments, each of the plurality of fastening members 150a, 150b may include threads. In one or more embodiments, the fastening members 150a, 150b, 150c may include, but not limited to, bolts, screws, eye lags, or eye bolts.

Figure 5:
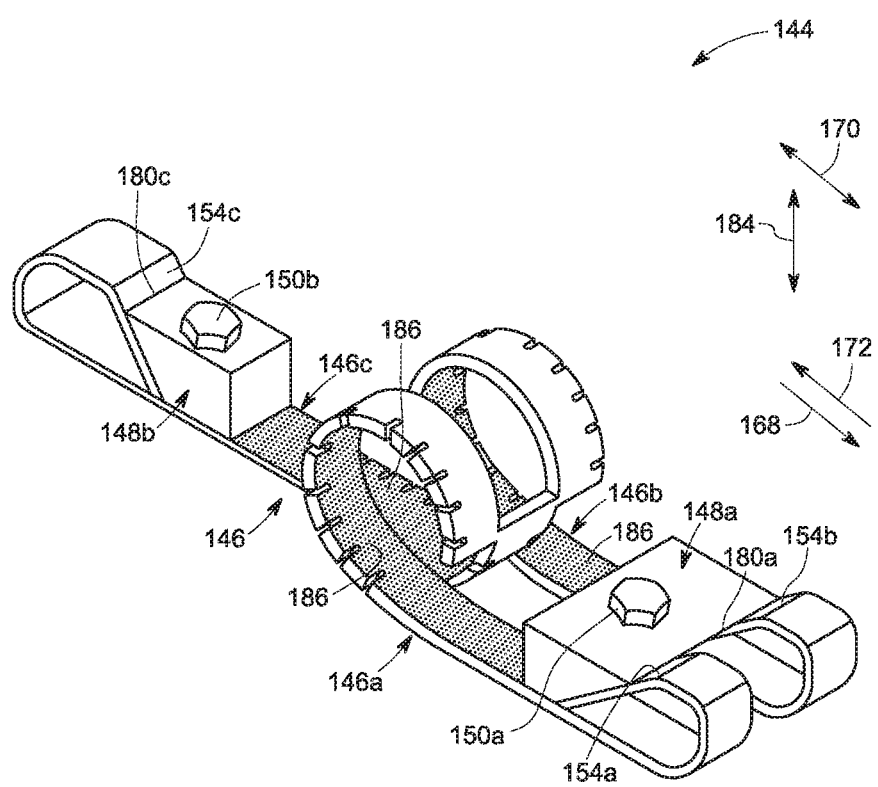
FIG. 5 is an assembled perspective view of the clamping device in accordance with one example embodiment of the present disclosure.

FIG. 5 is an assembled perspective view of the clamping device 144 in accordance with one example embodiment of the present disclosure. In the illustrated embodiment, the wedge-washer 148a is disposed on the plurality of first segments 146a, 146b and the wedge-washer 148b is disposed on the at least one second segment 146c. The sidewall 180a is in contact with the bent portion of the outwardly-extending ends 154a, 154b. Similarly, the sidewall 180b is in contact with the bent portion of the outwardly-extending end 154c. The fastening member 150a is disposed on the wedge-washer 148a for applying pressure on the wedge-washer 148a along the radial and longitudinal axes 184, 170. Specifically, the fastening member 150a is configured to apply the pressure on the plurality of first segments 146a, 146b in the first direction 168 along the longitudinal axis 170. The fastening member 150b is disposed on the wedge-washer 148b for applying pressure on the wedge-washer 148b along the radial and longitudinal axes 184, 170. In some embodiments, the fastening members 150a, 150b applies pressure along the radial axis 184, which further pushes the respective wedge-washers 148a, 148b along the radial axis 184 and the respective segments 146a, 146b, 146c along the longitudinal axis 170. In certain embodiments, the fastening member 150b is inserted via the hole 182b (as shown in FIG. 4) of the wedge-washer 148b and the elongated hole 166 (as shown in FIG. 4) of the at least one second segment 146c. Specifically, the fastening member 150b is configured to apply the pressure on the at least one second segment 146c in the second direction 172 along the longitudinal axis 170.

The clamping device may further include a solid lubricant coating 186 disposed along at least a portion of an inner conduit facing surface of each of the plurality of first segments 146a, 146b and/or along at least a portion of an inner surface of the at least one second segment 146c. In one embodiment, the solid lubricant coating 186 includes a tungsten disulfide ($WS_2$) material or a molybdenum disulfide ($MoS_2$) material or a graphite material. Specifically, the clamping device 144 may further include the solid lubricant coating 186 disposed along an inner surface (not labeled) of each of the plurality of first segments 146a, 146b and/or along an inner surface (not labeled) of the at least one second segment 146c. In some other embodiments, the solid lubricant coating 186 may be disposed only along the first portions 162a, 162b of the plurality of first segments 146a, 146b and along the first portion 162c of the at least one second segment 146c. In such embodiments, the first portions 162a, 162b, 162c are configured to receive the conduit. In one or more embodiments, the solid lubricant coating 186 is configured to reduce friction between the sheet metal 146 and the conduit and thereby minimize fretting wear of the sheet metal 146 and the conduit.

Figure 6:
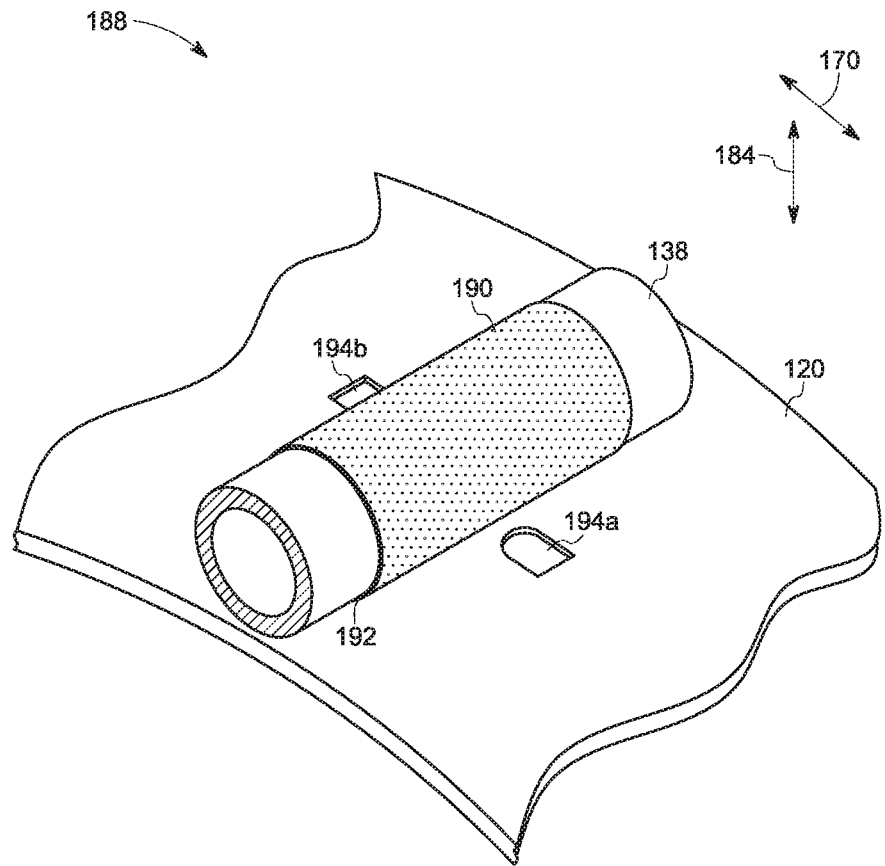
FIG. 6 is a perspective view of a portion of a turbine assembly including a conduit and a combustor-can in accordance with one example embodiment of the present disclosure.

FIG. 6 is a perspective view of a portion 188 of the turbine assembly including the conduit 138 (also referred as a "first conduit") and the combustor-can 120 in accordance with one example embodiment of the present disclosure. It should be noted herein that only the first conduit 138 is shown in FIG. 6 for ease of illustration and such an illustration should not be construed as a limitation of the present disclosure.

In the illustrated embodiment, the portion 188 of the turbine assembly further includes a solid lubricant coating 190 disposed along a portion 192 of an outer surface (not labeled) of the conduit 138. In one embodiment, the portion 192 is configured to be clamped to the combustor-can 120 with a clamping device such as the clamping device 144.

The combustor-can 120 includes elongated holes 194a, 194b spaced apart from each other along the longitudinal direction of the combustor can. It should be noted that the longitudinal direction is substantially same as the longitudinal axis 170 of the sheet metal 146. Specifically, the conduit 138 is disposed on the combustor-can 120 such that the conduit 138 is located between the elongated holes 194a, 194b. In one embodiment, each of the elongated holes 194a, 194b is a through-hole and may include threads. In such embodiments, the elongated holes 194a, 194b are configured to receive the fastening members 150a, 150b (as shown in FIG. 5) along the radial axis 184 and slide the fastening members 150a, 150b along the longitudinal axis 170.

Figure 7:
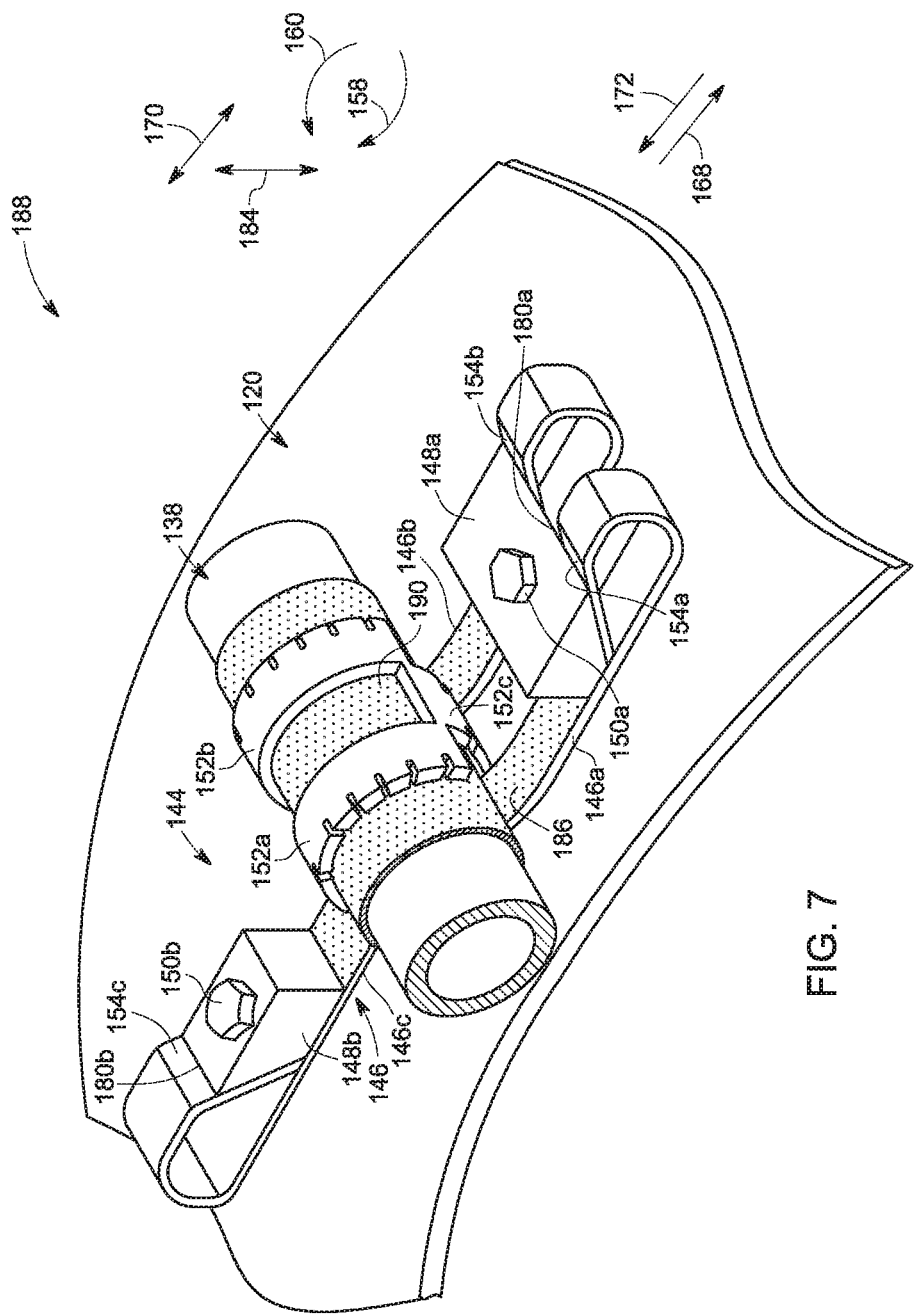
FIG. 7 is a perspective view of the portion of the turbine assembly including the conduit clamped to the combustor-can using a clamping device in accordance with one example embodiment of the present disclosure.

FIG. 7 is a perspective view of the portion 188 of the turbine assembly including the conduit 138 clamped to the combustor-can 120 using the clamping device 144 in accordance with one example embodiment of the present disclosure.

In the illustrated embodiment, the conduit-facing ends 152a, 152b of the plurality of first segments 146a, 146b are wrapped around the conduit 138 in counter clockwise direction 160 and the conduit-facing end 152c of the at least one second segment 146c is wrapped around the conduit 138 in clockwise direction 158 from the unified conduit-facing end 152 (as shown in FIG. 4). In such embodiments, at least a portion of the solid lubricant coatings 186, 190 are in contact with each other.

The wedge-washer 148a is disposed on the plurality of first segments 146a, 146b such that the sidewall 180a of the wedge-washer 148a is in contact with the outwardly-extending ends 154a, 154b. Further, the wedge-washer 148b is disposed on the at least one second segment 146c such that the sidewall 180b of the wedge-washer 148b is in contact with the outwardly-extending end 154c. The fastening member 150a is inserted through the hole 182a (as shown in FIG. 4) of the wedge-washer 148a and the elongated hole 194a of the combustor-can 120 such that the plurality of first segments 146a, 146b are stretched along the radial and longitudinal axes 184, 170 in the first direction 168. Similarly, the fastening member 150b is inserted through the hole 182b (as shown in FIG. 4) of the wedge-washer 148a, the elongated hole 166 (as shown in FIG. 4) of the at least one second segment 146c, and the elongated hole 194a of the combustor-can 120 such that the at least one second segment 146c is stretched along the radial and longitudinal axes 184, 170 in the second direction 172. In one or more embodiments, the clamping device 144 is thereby configured to clamp the conduit 138 to the combustor-can 120.

In some embodiments, the fastening member 150a, 150b are simultaneously inserted through respective wedge-washers 148a, 148b for clamping the conduit 138 to the combustor-can 120. In some other embodiments, the fastening member 150a, 150b are sequentially inserted through a respective wedge-washers 148a, 148b for clamping the conduit 138 to the combustor-can 120. In one embodiment, the clamping device 144 has a stiffness in a range from about 1000 N/mm to about 100000 N/mm. The clamping device 144 allows the sheet metal 146 to move enough in either or both radial and longitudinal axes 184, 170 to absorb the vibrations generated by one or more components, such as the combustor-can 120 or the conduit 138, of the turbine assembly 100.

Figure 8:
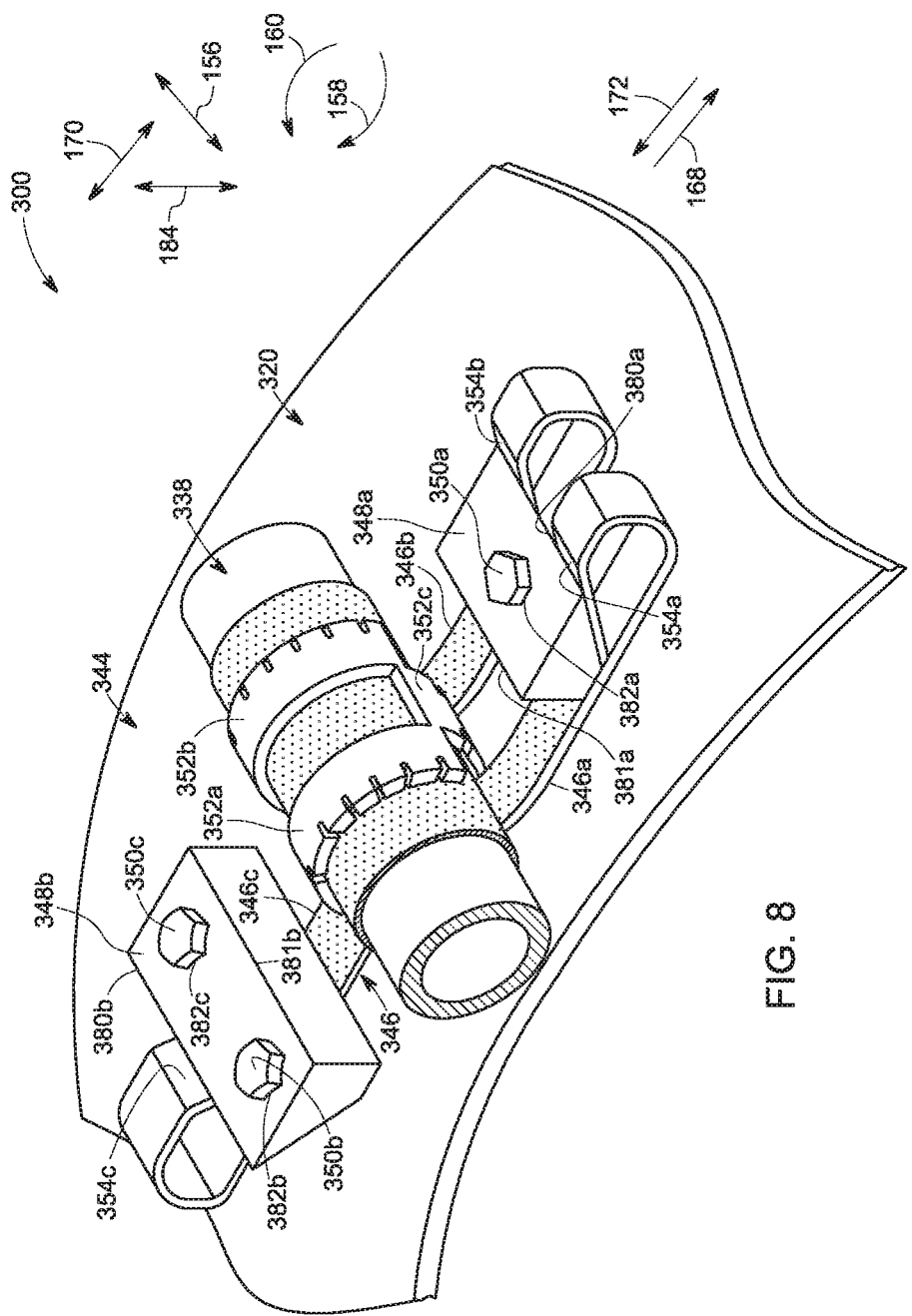
FIG. 8 is a perspective view of a portion of a turbine assembly in accordance with another example embodiment of the present disclosure.

FIG. 8 is a perspective view of a portion 300 of a turbine assembly in accordance with another example embodiment of the present disclosure. In one embodiment, the turbine assembly includes a conduit 338 clamped to a combustor-can 320 with a clamping device 344. In one embodiment, the clamping device 344 includes a sheet metal 346 having a plurality of first segments 346a, 346b and at least one second segment 346c. The clamping device 344 further includes the plurality of wedge-washers 348a, 348b, and a plurality of fastening members 350a, 350b, 350c.

As discussed in the embodiment of FIG. 7, conduit-facing ends 352a, 352b of each of the plurality of first segments 346a, 346b and conduit-facing end 352c of the at least one second segment 346c are wrapped around the conduit 338 in opposite directions 158, 160. Further, outwardly-extending ends 354a, 354b of the plurality of first segments 346a, 346b extend in a first direction 168 and an outwardly-extending end 354c of the at least one second segment 346c extends in a second direction 172 opposite to the first direction 168. The wedge-washer 348a is disposed on the plurality of first segments 346a, 346b such that a sidewall 380a of the wedge-washer 348a is in contact with the outwardly-extending ends 354a, 354b. The wedge-washer 348b is disposed on the at least one second segment 346c such that a sidewall 380b of the wedge-washer 348b is in contact with the outwardly-extending end 354c.

The wedge-washer 348a has a hole 382a disposed between the sidewalls 380a, 381a and the wedge-washer 348b has a plurality of holes 382b, 382c disposed between the sidewalls 380b, 381b. The plurality of holes 382b, 382c is spaced apart from each other along a lateral axis 156 of the sheet metal. The fastening member 350a is inserted through the hole 382a and a first elongated hole (not shown) formed in the combustor-can 320. The fastening member 350b is inserted through the hole 382b and the second elongated hole (not shown) formed in the combustor-can 320. Similarly, the fastening member 350c is inserted through the hole 382c and the third elongated hole (not shown) formed in the combustor-can 320. It should be noted herein that the at least one second segment 346c need not has to have an elongated hole as discussed in the embodiment of FIG. 7. The plurality of fastening members 350a, 350b, 350c is thereby configured to apply pressure on the respective wedge-washer 348a, 348b along radial and longitudinal axes 184, 170 of the sheet metal 346 and clamp the conduit 338 to the combustor-can 320 via the sheet metal 346.

Figure 9:
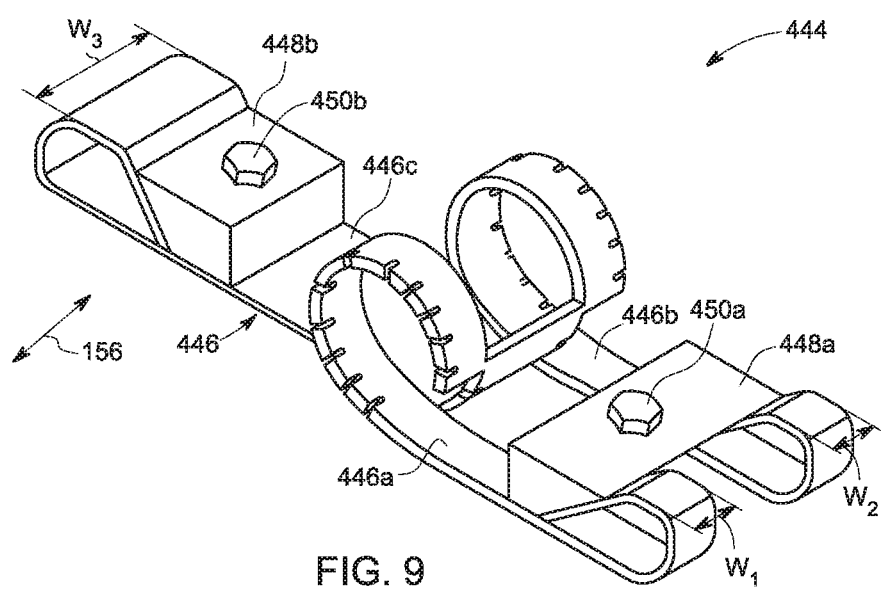
FIG. 9 is a perspective view of a clamping device in accordance with yet another example embodiment of the present disclosure.

FIG. 9 is a perspective view of a clamping device 444 in accordance with yet another example embodiment of the present disclosure. In the illustrated embodiment, the clamping device 444 includes a sheet metal 446, a plurality of wedge-washers 448a, 448b, and a plurality of fastening members 450a, 450b. The sheet metal 446 includes a plurality of first segments 446a, 446b and at least one second segment 446c. In one embodiment, the first segment 446a has a first width "$W_1$" and the first segment 446b has a second width "$W_2$". The second segment 446c has a third width "$W_3$". In certain embodiments, the first width "$W_1$"

and the second width "W₂" are substantially equal. The third width "W₃" is equal to sum of the first width "W₁" and the second width "W₂". The widths "W₁", "W₂", "W₃" of the plurality of first segments 446*a*, 446*b* and the at least one second segment 446*c* extend along a lateral axis 156 of the sheet metal 446. In such embodiments, the sheet metal 446 applies an equal pressure on the conduit (not shown) along the lateral axis 156 in opposite directions, using the at least one second segment 446*c* having the first width "W₁" and the plurality of first segments 446*a*, 446*b* having a respective second and third widths "W₂", "W₃".

Figure 10:
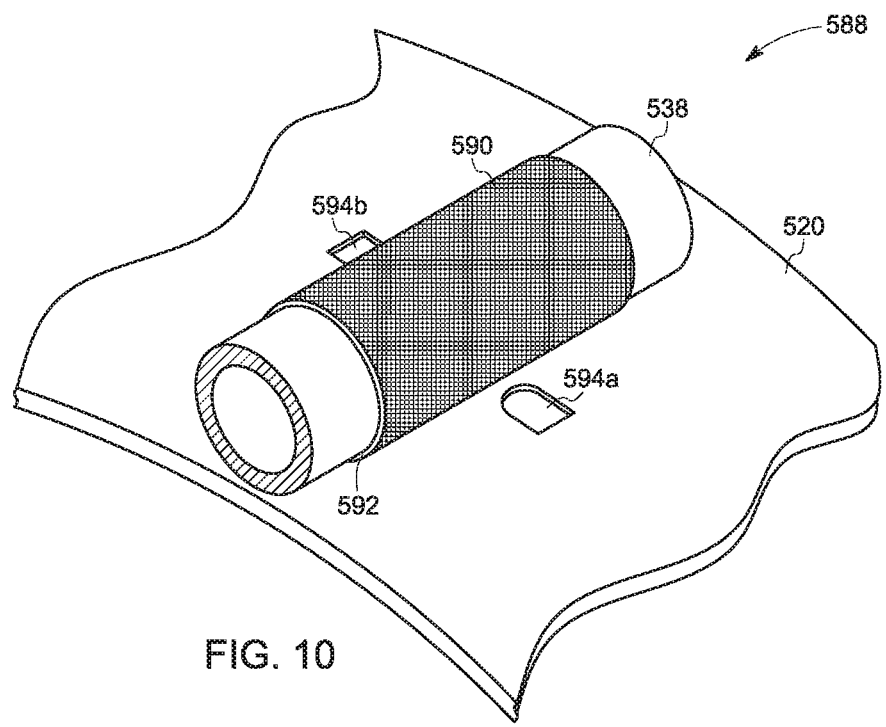
FIG. 10. is a perspective view of a portion of a turbine assembly including a conduit and a combustor-can in accordance with yet another example embodiment of the present disclosure.

FIG. 10. is a perspective view of a portion 588 of a turbine assembly including a conduit 538 and a combustor-can 520 in accordance with yet another example embodiment of the present disclosure. The conduit 538 is disposed on the combustor-can 520. The turbine assembly includes a mesh 590 wrapped on a portion 592 of an outer surface (not labeled) of the conduit 538. The combustor-can 520 includes elongated holes 594*a*, 594*b* spaced apart from each other along the longitudinal direction of the turbine assembly. In one or more embodiments, the mesh 590 reduces friction between a clamping device and the conduit 538 and thereby minimize fretting wear of the clamping device and the conduit 538.

Figure 11:
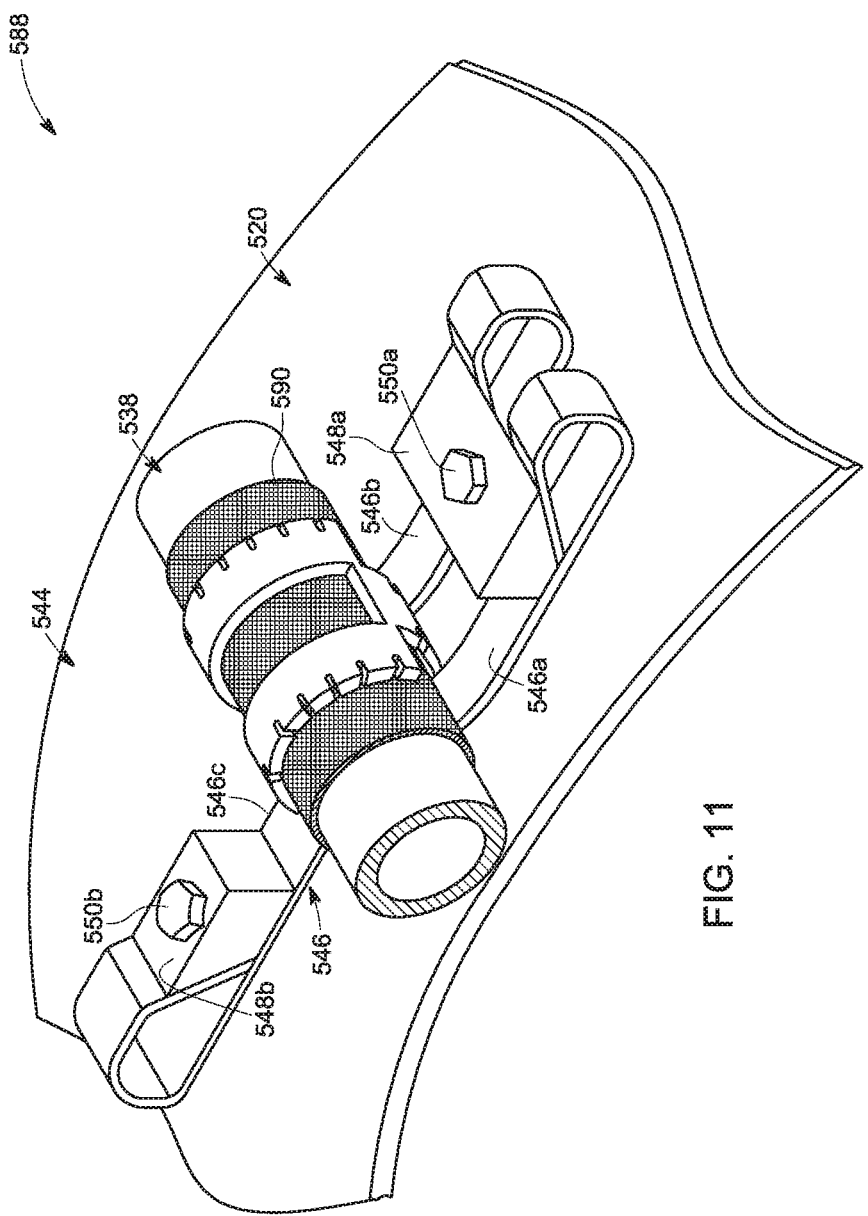
FIG. 11 is a perspective view of the portion of the turbine assembly including the conduit clamped to the combustor-can using the clamping device in accordance with the example embodiment of FIG. 10.

FIG. 11 is a perspective view of the portion 588 of the turbine assembly including the conduit 538 clamped to the combustor-can 520 using a clamping device in accordance with the example embodiment of FIG. 10. The clamping device 544 is substantially similar to the clamping device 144 discussed in the embodiment of FIG. 4. The clamping device 544 includes a sheet metal 546, the plurality of wedge-washers 548*a*, 548*b*, and a plurality of fastening members 550*a*, 550*b*. The sheet metal 546 includes a plurality of first segments 546*a*, 546*b* and at least one second segment 546*c*, which are wrapped around the mesh 590.

Figure 12:
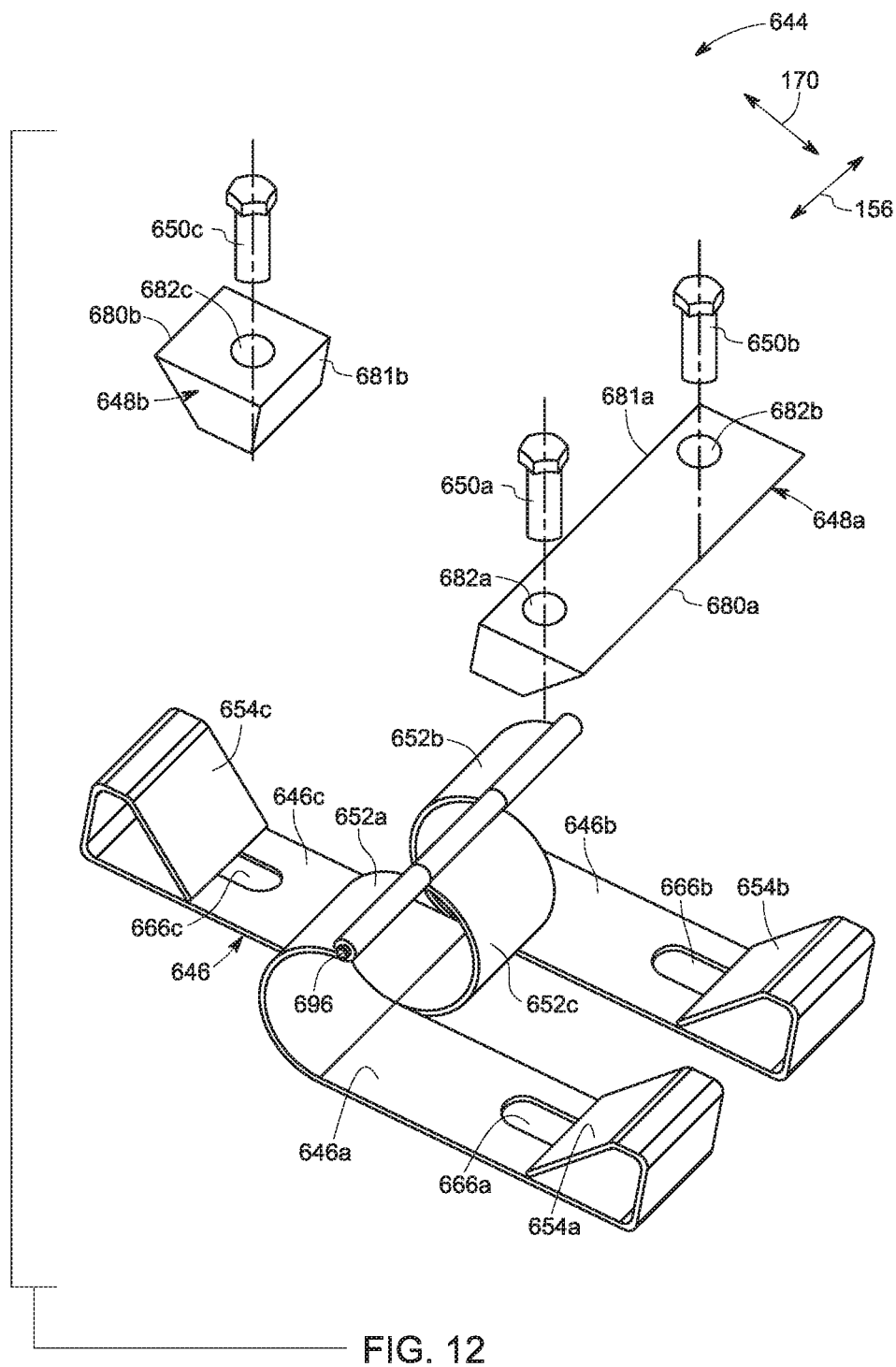
FIG. 12 is an exploded perspective view of a clamping device in accordance with yet another example embodiment of the present disclosure.

FIG. 12 is an exploded perspective view of a clamping device 644 in accordance with yet another example embodiment of the present disclosure. The clamping device 644 includes a sheet metal 646, a plurality of wedge-washers 648*a*, 648*b*, and a plurality of fastening members 650*a*, 650*b*, 650*c*. The sheet metal 646 includes a plurality of first segments 646*a*, 646*b* and at least one second segment 646*c*. Each of the plurality of first segments 646*a*, 646*b* includes a respective conduit-facing end 652*a*, 652*b* and a respective outwardly-extending end 654*a*, 654*b*. Similarly, the at least one second segment 646*c* includes a conduit-facing end 652*c* and an outwardly-extending end 654*c*. In one embodiment, the conduit-facing ends 652*a*, 652*b* of each of the plurality of first segments 646*a*, 646*b* are coupled to the conduit-facing end 652*c* of the at least one second segment 646*c* via an axial locking pin 696. Specifically, the conduit-facing ends 652*a*, 652*b*, 652*c* are joined to each other along a lateral axis 156 of the sheet metal 646 via the locking pin 696. In one embodiment, the locking pin 696 is configured to hold the conduit-facing ends 652*a*, 652*b*, 652*c* together and prevent the movement of conduit-facing ends 652*a*, 652*b*, 652*c* along a longitudinal axis 170 of the sheet metal 646.

The first segment 646*a* has a first elongated hole 666*a*, the first segment 646*b* has a second elongated hole 666*b*, and the second segment 646*b* has a third elongated hole 666*c*. In the illustrated embodiment, the elongated holes 666*a*, 666*b*, 666*c* are disposed proximate to a respective outwardly-extending ends 654*a*, 654*b*, 654*c*. Each of the outwardly-extending ends 654*a*, 654*b*, 654*c* is bent at a respective bend angle relative to the longitudinal axis 170, towards a respective conduit-facing end 652*a*, 652*b*, 652*c*. For example, the outwardly-extending end 654*a* is bend towards the conduit-facing end 652*a*, the outwardly-extending end 654*b* is bend towards the conduit-facing end 652*b*, and the outwardly-extending end 654*c* is bend towards the conduit-facing end 652*c*. In some embodiments, the bend angle of each of the outwardly-extending ends 654*a*, 654*b*, 654*c* is in a range from about 15 degrees to about 50 degrees. In a more specific example, each bend angle of the outwardly-extending ends 654*a*, 654*b*, 654*c* is in a range from about 20 degrees to about 45 degrees. In one embodiment, each bend angle of the outwardly-extending ends 654*a*, 654*b*, 654*c* is at 30 degrees. In another embodiment, each bend angle of the outwardly-extending ends 654*a*, 654*b*, 654*c* is at 45 degrees.

In one embodiment, each of the plurality of wedge-washers 648*a*, 648*b* includes a respective sidewall 680*a*, 680*b*. The sidewall 680*a* is inclined at an angle in a direction opposite to the bend angle of a respective outwardly-extending end 654*a*, 654*b* of each of the plurality of first segments 646*a*, 646*b*. In one or more embodiments, the angle may be a pre-defined angle in correspondence to the bend angle of a respective outwardly-extending end 654*a*, 654*b*, 654*c*. The sidewall 180*b* is inclined at an angle in a direction opposite to the bend angle of the outwardly-extending end 654*c* of the at least one second segment 646*c*. In some embodiments, the angle of each of the sidewalls 680*a*, 680*b* is in a range from about 130 degrees to about 165 degrees. In a more specific example, the angle of each of the sidewalls 680*a*, 680*b* is in a range from about 135 degrees to about 160 degrees. In one embodiment, the angle of each of the sidewalls 680*a*, 680*b* is at 145 degrees. In another embodiment, the angle of each of the sidewalls 680*a*, 680*b* is at 160 degrees. In one embodiment, the pre-defined angle is a mutually complementary angle to the bend angle.

The wedge-washer 648*a* has a first hole 682*a* and a second hole 682*b*, which are spaced apart from each other along the lateral axis 156 and disposed between the sidewalls 680*a*, 681*a*. The wedge-washer 648*b* has a third hole 682*c* disposed between the sidewalls 680*b*, 681*b*. In certain embodiments, the first, second, and third holes 682*a*, 682*b*, 682*c* are through-holes and may include threads. In the illustrated embodiment, each of the plurality of fastening members 650*a*, 650*b*, 650*c* is a bolt. In such embodiments, each of the plurality of fastening members 650*a*, 650*b*, 650*c* may include threads. Although one wedge washer 648*a* is shown in FIG. 12 for purposes of example, if desired, in embodiments wherein there are elongated holes 666*a* and 666*b* in the first segments 646*a*, 646*b*, each of the first segments 646*a*, 646*b* may have a separate wedge washer (not shown).

Figure 13:
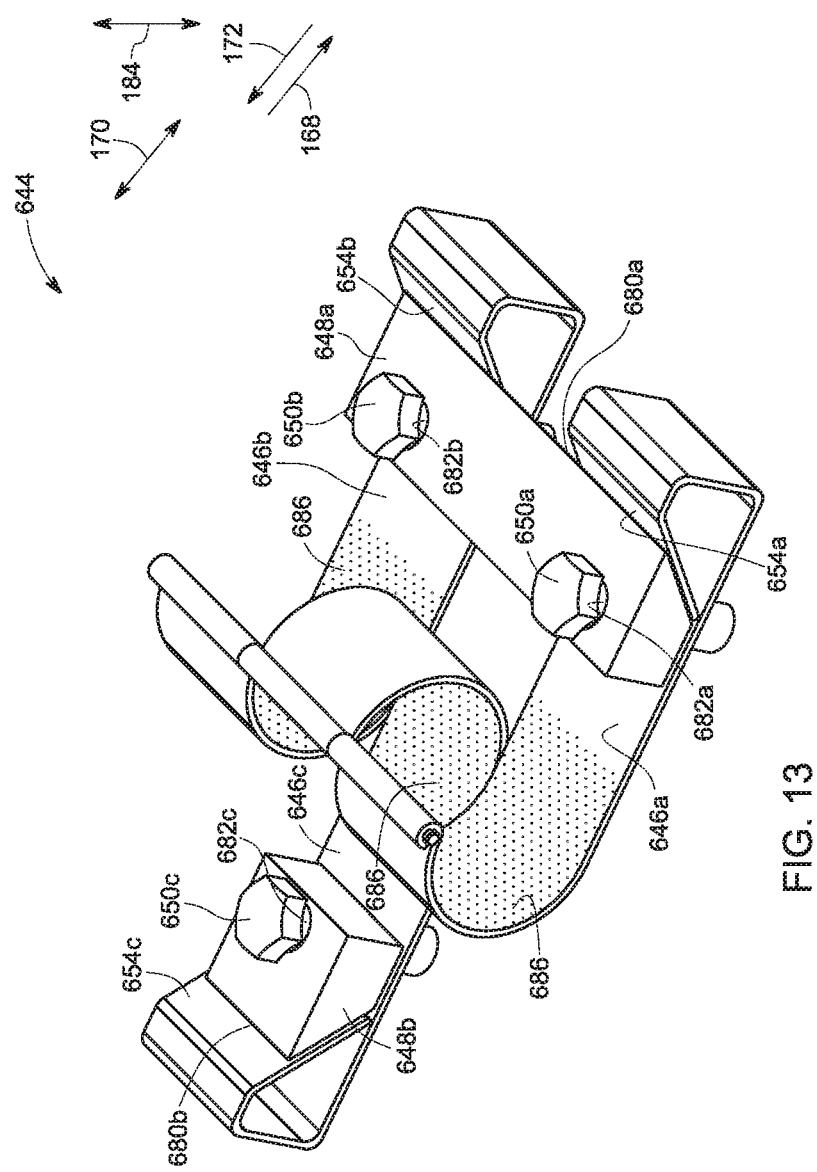
FIG. 13 is an assembled perspective view of the clamping device in accordance with yet another example embodiment of the present disclosure.

FIG. 13 is an assembled perspective view of the clamping device 644 in accordance with the example embodiment of FIG. 12. In the illustrated embodiment, the wedge-washer 648*a* is disposed on the plurality of first segments 646*a*, 646*b* and the wedge-washer 648*b* is disposed on the at least one second segment 646*c*. The sidewall 680*a* of the wedge-washer 648*a* is in contact with the outwardly-extending ends 654*a*, 654*b* and the sidewall 680*b* of the wedge-washer 648*b* is in contact with the outwardly-extending end 654*c*. The fastening members 650*a*, 650*b* are disposed on the wedge-washer 648*a* for applying pressure on the wedge-washer 648*a* along a radial axis 184 and the longitudinal axis 170 of the sheet metal 646. The fastening member 650*c* is disposed on the wedge-washer 648*b* for applying pressure on the wedge-washer 648*b* along the radial and longitudinal axes 184, 170. In one embodiment, the fastening member 650*a* is inserted via the first hole 682*a* and the first elongated hole 666a (e.g., similar to one shown in FIG. 4) of the first segment 646a and the fastening member 650b is inserted via the second hole 682b and the second elongated hole 666b (e.g., similar to one shown in FIG. 4) of the first segment 646a. Similarly, the fastening member 650c is inserted via the third hole 682c and the third elongated hole 666c (e.g., similar to one shown in FIG. 4) of the at least one second segment 646c. Specifically, the fastening members 650a, 650b are configured to apply the pressure on the plurality of first segments 646a, 646b in the first direction 168 along the longitudinal axis 170. The fastening member 650c is configured to apply the pressure on the at least one second segment 646c in the second direction 172 along the longitudinal axis 170. In one or more embodiments, a torque wrench (not shown) may be used to precisely apply specific torque on the fastening members 650a, 650b, 650c for transmitting the pressure on the plurality of first segments 646a, 646b and the at least one second segment 646c. In such embodiments, the fastening members 650a, 650b, 650c may include, but not limited to bolts, screws, eye lags, or eye bolts. In one embodiment, the clamping device 644 further includes a solid lubricant coating 686 disposed along an inner surface (not labeled) of each of the plurality of first segments 646a, 646b and along an inner surface (not labeled) of the at least one second segment 646c. In some other embodiments, the solid lubricant coating 686 may be disposed only along a portion of the plurality of first segments 646a, 646b and along a portion of the at least one second segment 646c. In such embodiments, the portions are configured to receive the conduit. In one or more embodiments, the solid lubricant coating 686 helps reduce friction between the sheet metal 646 and the conduit and thereby minimizes fretting wear of the sheet metal 646 and/or the conduit.

Figure 14:
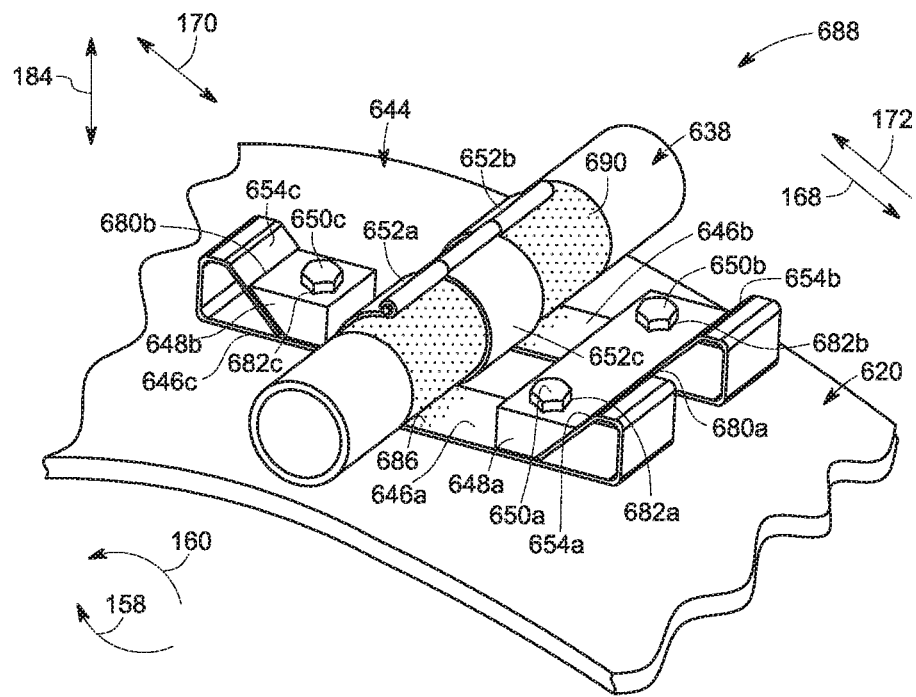
FIG. 14 is a perspective view of a portion of a turbine assembly including a conduit clamped to a combustor-can using the clamping device in accordance with yet another example embodiment of the present disclosure.

FIG. 14 is a perspective view of a portion 688 of one embodiment of a turbine assembly including a conduit 638 clamped to a combustor-can 620 using the clamping device 644 in accordance with the example embodiments of FIGS. 12 and 13.

In one embodiment, the combustor-can 620 has a fourth elongated hole and a fifth elongated hole (not shown), which are spaced apart from each other along the lateral axis 156. Further, the combustor-can 620 has a sixth elongated hole spaced apart from the fourth and fifth elongated holes along the longitudinal axis 170. In one embodiment, the conduit 638 is disposed on the combustor-can 620 along the lateral direction. Specifically, the conduit 638 is disposed between the sixth elongated hole and the fourth and fifth holes. The turbine assembly may further include a solid lubricant coating 690 disposed along a portion of the conduit 638.

The conduit-facing ends 652a, 652b of the plurality of first segments 646a, 646b are wrapped around the conduit 638 in counter clockwise direction 160 and the conduit-facing end 652c of the at least one second segment 646c is wrapped around the conduit 638 in clockwise direction 158. In such embodiments, at least a portion of the solid lubricant coatings 686, 692 get in touch with each other. The outwardly-extending ends 654a, 654b of the plurality of first segments 646a, 646b extend in a first direction 168 and the outwardly-extending end 654c of the at least one second segment 646c extends in a second direction 172. The wedge-washer 648a is disposed on the plurality of first segments 646a, 646b such that the sidewall 680a of the wedge-washer 648a is in contact with the outwardly-extending ends 654a, 654b. Further, the wedge-washer 648b is disposed on the at least one second segment 646c such that the sidewall 680b of the wedge-washer 648b is in contact with the outwardly-extending end 654c.

The fastening member 650a is inserted via the first hole 682a, the first elongated hole 666a (similar to the one shown in FIG. 12), and the fifth elongated hole 666a. The fastening member 650b is inserted via the second hole 682b, the second elongated hole 666b (similar to the one shown in FIG. 12), and the sixth elongated hole. The fastening member 650c is inserted via the third hole 682c, the third elongated hole 666c (similar to the one shown in FIG. 12), and the sixth elongated hole. The fastening members 650a, 650b are configured to apply the pressure on the plurality of first segments 646a, 646b in the first direction 168 along the longitudinal axis 170. The fastening member 650c is configured to apply the pressure on the at least one second segment 646c in the second direction 172 along the longitudinal axis 170. In one or more embodiments, the clamping device 644 is thereby configured to clamp the conduit 638 to the combustor-can 620. In some embodiments, the fastening member 650a, 650b, 650c are simultaneously inserted for clamping the conduit 638 to the combustor-can 620. In some other embodiments, the fastening member 650a, 650b and the fastening member 560c are sequentially inserted for clamping the conduit 638 to the combustor-can 620.

Figure 15:
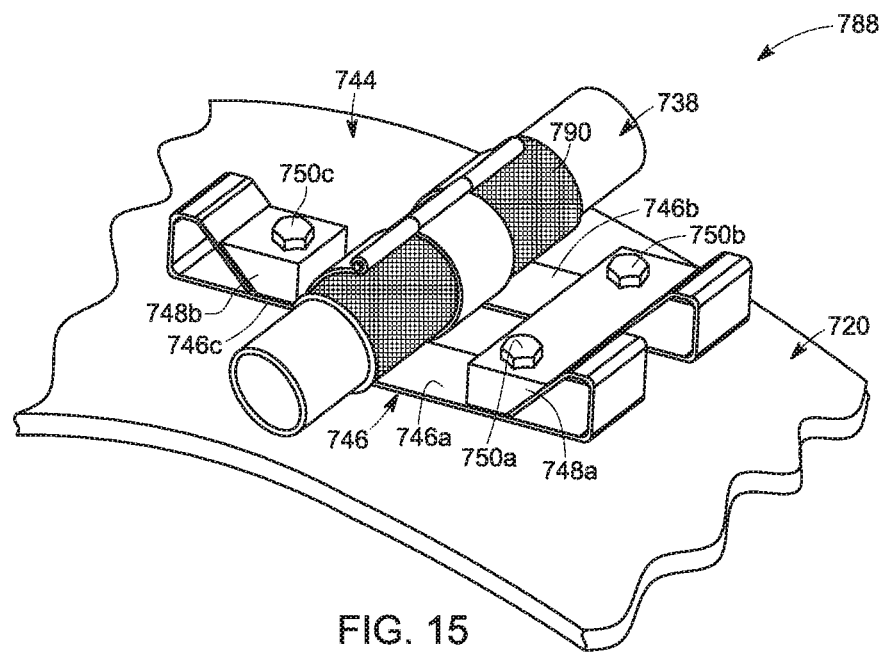
FIG. 15 is a perspective view of a portion of a turbine assembly including a conduit clamped to a combustor-can using the clamping device in accordance with another example embodiment.

FIG. 15 is a perspective view of a portion 788 of a turbine assembly including a conduit 738 clamped to a combustor-can 720 using the clamping device 744 in accordance with another example embodiment. The turbine assembly includes a mesh 790 disposed along a portion of the combustor-can 720. In such embodiment, the portion is configured to be wrapped by a sheet metal 746 of the clamping device 744.

The clamping device 744 is substantially similar to the clamping device 644 discussed in the embodiment of FIG. 12. The clamping device 744 includes the sheet metal 746, the plurality of wedge-washers 748a, 748b, and a plurality of fastening members 750a, 750b, 750c. The sheet metal 746 includes a plurality of first segments 746a, 746b and at least one second segment 746c, which are wrapped around the mesh 790. The wedge-washer 748a is disposed on a plurality of first segments 746a, 746b of the sheet metal 746 and the wedge-washer 748b is disposed on the at least one second segment 746c. The fastening members 750a, 750b is disposed on the wedge-washer 748a to clamp the plurality of first segments 746a, 746b to the combustor-can 720. The fastening member 750c is disposed on the wedge-washer 748b to clamp the at least one second segment 746c to the combustor-can 720.

Figure 16:
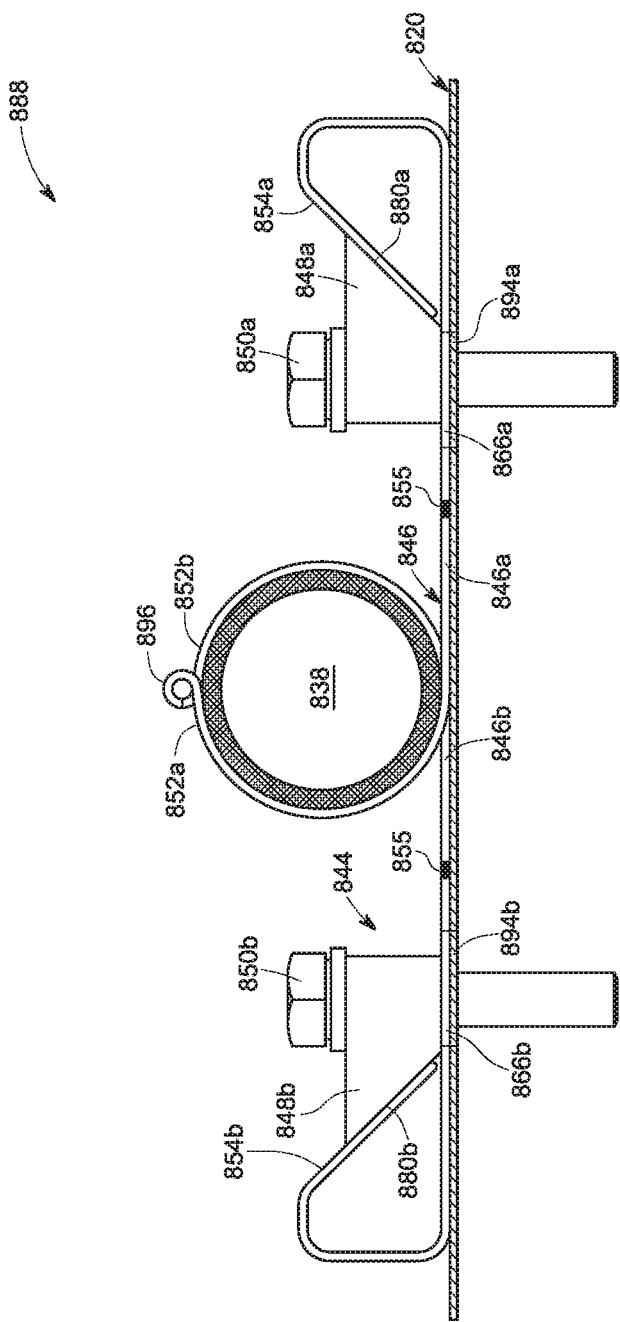
FIG. 16 is a side view of a portion of a turbine assembly in accordance with yet another example embodiment of the present disclosure.

FIG. 16 is a side view of a portion 888 of a turbine assembly in accordance with yet another example embodiment of the present disclosure. The turbine assembly includes a conduit 838 disposed on a combustor-can 820 and clamped to the combustor-can 820 using a clamping device 844.

In one embodiment, the clamping device 844 includes a sheet metal 846, a plurality of wedge-washers 848a, 848b, and a plurality of fastening members 850a, 850b. The sheet metal 846 includes a plurality of first segments 846a and at least one second segment 846b. It should be noted herein that the only one first segment 846a of sheet metal 846 is visible in the illustrated side view. In one or more embodiments, a conduit-facing end 852a of the first segment 846a is coupled to a conduit-facing end 852b of the second segment 846b via a locking pin 896. The conduit-facing ends 852a, 852b of a respective first and second segments 846a, 846b are wrapped around the conduit 838. In one embodiment, each of the conduit-facing ends 852a, 852b is in a cylindrical form having a diameter in a range from about 3 mm to about 5 mm. In one embodiment, the conduit-facing ends 852a, 852b are wires or ropes. Outwardly-extending ends 854a, 854b of a respective first and second segment 846a, 846b extends along an opposite direction. In one embodiment, each of the outwardly-extending ends 854a, 854b is a flat metal strip. In one embodiment, the conduit-facing ends 852a, 852b are coupled to a respective outwardly-extending ends 854a, 854b via a suitable coupling member 855 such as a weld or a clamp. The wedge-washer 848a is disposed on the first segment 846a such that a sidewall 880a of the wedge-washer 848a is in contact with the outwardly-extending end 854a. The wedge-washer 848b is disposed on the second segment 846b such that a sidewall 880b of the wedge-washer 848b is in contact with the outwardly-extending end 854b. The fastening member 850a is inserted through the hole (not shown) in the wedge-washer 848a, a first elongated hole 866a formed in the first segment 846a, and a second elongated hole 894a formed in the combustor-can 820 for clamping the conduit 838 to the combustor-can 820. Similarly, the fastening member 850b is inserted through the hole (not shown) in the wedge-washer 848b, a first elongated hole 866b formed in the second segment 846b, and a second elongated hole 894b formed in the combustor-can 820 for clamping the conduit 838 to the combustor-can 820.

In accordance with yet another example embodiment, a method for clamping at least one conduit to a combustor-can is disclosed. The method involves obtaining a sheet metal including a plurality of first segments and at least one second segment wherein, each of the plurality of first segments and the at least one second segment include a conduit-facing end and an outwardly-extending end. The conduit-facing ends are joined to each other along a lateral axis of the sheet metal. The method involves wrapping the conduit-facing ends of each of the plurality of first segments and the at least one second segment of the sheet metal around the conduit in opposite directions and extending the outwardly-extending ends of the plurality of first segments in an opposite direction to the outwardly-extending end of the at least one second segment. The method further involves bending each of the outwardly-extending ends at a respective bend angle relative to a longitudinal axis of the sheet metal, towards a respective conduit-facing end of a respective one of the plurality of first segments or the at least one second segment. Further, the method involves disposing at least one wedge-washer of a plurality of wedge-washers on each of the plurality of first segments and the at least one second segment such that a sidewall of the at least one wedge-washer is in contact with a respective outwardly-extending end of each of the plurality of first segments and the at least one second segment. The sidewall is inclined in a direction opposite to the bend angle. The method further involves disposing at least one fastening member on each of the plurality of wedge-washers for applying pressure on the respective wedge-washer along radial and longitudinal axes of the sheet metal and thereby clamping the at least one fastening member to the combustor-can.

Figure 17:
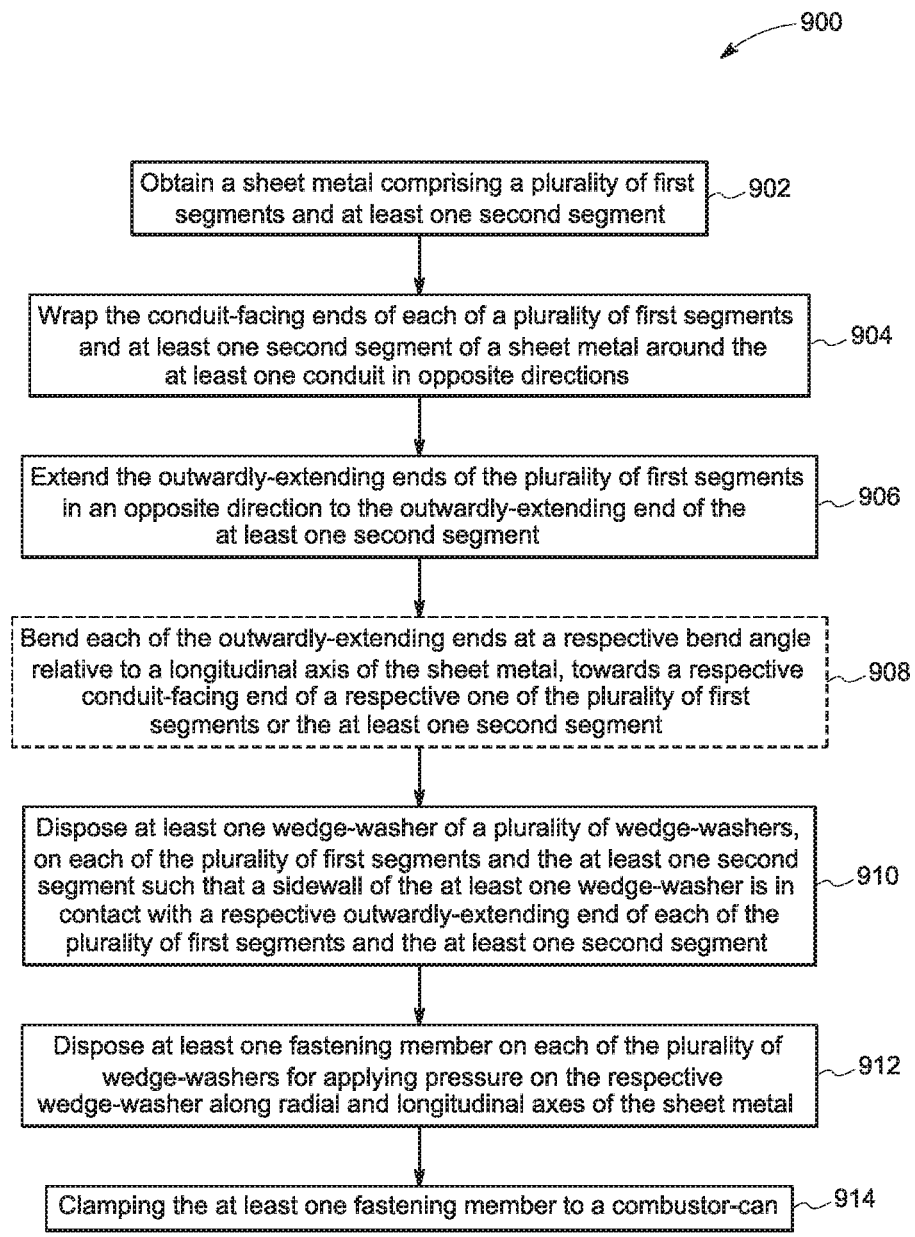
FIG. 17 is a flow diagram of a method for clamping at least one conduit to a combustor-can in accordance with one example embodiment.

FIG. 17 is a flow diagram of a method 900 for clamping at least one conduit to a combustor-can in accordance with one example embodiment. The method 900 involves obtaining a sheet metal including a plurality of first segments and at least one second segment in step 902. Each of the plurality of first segments includes a conduit-facing end and an outwardly-extending end. Similarly, the at least one second segment includes a conduit-facing end and an outwardly-extending end. The method 900 further involves wrapping the conduit-facing ends of each of the plurality of first segments and the at least one second segment of the sheet metal around the conduit in opposite directions in step 904. In one embodiment, the plurality of first segments is wrapped in counter clockwise direction and the at least one second segment is wrapped in clockwise direction. The method 900 further involves extending the outwardly-extending ends of the plurality of first segments in an opposite direction to the outwardly-extending end of the at least one second segment in step 906. Further, the method 900 involves a step of bending each of the outwardly-extending ends at a respective bend angle relative to a longitudinal axis of the sheet metal, towards a respective conduit-facing end of a respective one of the plurality of first segments or the at least one second segment in step 908. In certain embodiments, the outwardly-extending ends are pre-bent at a respective bend angle relative to the longitudinal axis, towards a respective conduit-facing end of a respective one of the plurality of first segments or the at least one second segment. In such embodiments, the bending step may be avoided from the method 900. The method 900 involves disposing at least one wedge-washer of a plurality of wedge-washers, on each of the plurality of first segments and the at least one second segment such that a sidewall of the at least one wedge-washer is in contact with a respective outwardly-extending end of each of the plurality of first segments and the at least one second segment in step 910. Further, the method 900 involves disposing at least one fastening member on each of the plurality of wedge-washers for applying pressure on the respective wedge-washer along radial and longitudinal axes of the sheet metal, in step 912. In some embodiments, the fastening members applies pressure along a radial axis, which further pushes the respective wedge-washers along the radial axis and the respective segments along a longitudinal axis. In one embodiment, the step 912 involves pushing the outwardly-extending ends of each of the plurality of first segments in a first direction along the longitudinal axis and the outwardly-extending end of the at least one second segment in a second direction along the longitudinal axis. In such embodiments, the first direction is opposite to the second direction. The method 900 further involves clamping the at least one fastening member to the combustor-can in step 914. In accordance with one or more embodiments discussed herein, an example clamping device is configured to clamp at least one conduit to a combustor-can. The example clamping device is flexible along longitudinal and radial axes. In some embodiments, the clamping device has a stiffness in a range from about 1000 N/mm to about 100000 N/mm. Thus, the stiffness of the clamping device may be adjusted such that the clamping device absorbs vibration getting transmitted by either the combustor-can and the conduit, under the presence of a load. The clamping device is easy to assemble and disassemble. The example clamping device may help avoiding the usage of a bush for holding the conduit with tight clearance, thereby reducing the occurrence of a fretting wear between contacting surfaces of a sheet metal of the clamping device and the conduit.

While only certain features of embodiments have been illustrated and described herein, many modifications and changes will occur to those skilled in the art. It is, therefore, to be understood that the appended embodiments are intended to cover all such modifications and changes as falling within the spirit of the disclosure.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A clamping device for clamping a conduit in a position, comprising:
    a sheet metal comprising a plurality of first segments and at least one second segment,
    wherein each of the plurality of first segments and the at least one second segment comprise a conduit-facing end and an outwardly-extending end,
    wherein the conduit-facing ends are joined to each other along a lateral axis of the sheet metal and configured to wrap around the conduit in opposite directions,
    wherein the outwardly-extending ends of the plurality of first segments extend in an opposite direction to the outwardly-extending end of the at least one second segment, and
    wherein each of the outwardly-extending ends has an angled portion at a respective bend angle relative to a longitudinal axis of the sheet metal, towards a respective conduit-facing end of a respective one of the plurality of first segments or the at least one second segment;
    a plurality of wedge-washers, wherein at least one wedge-washer is disposed on each of the plurality of first segments and the at least one second segment, wherein each of the at least one wedge-washer comprises an angled sidewall inclined along and in contact with the angled portion of a respective outwardly-extending end of each of the plurality of first segments and the at least one second segment; and
    a plurality of fastening members with at least one fastening member disposed on each of the plurality of wedge-washers for applying pressure on the respective wedge-washer along radial and longitudinal axes of the sheet metal.

2. The clamping device of claim 1, wherein the conduit-facing ends of each of the plurality of first segments are coupled to the conduit-facing end of the at least one second segment via a locking pin.

3. The clamping device of claim 1, wherein the conduit-facing ends of each of the plurality of first segments are integrated to the conduit-facing end of the at least one second segment to form a unified conduit-facing end of the sheet metal.

4. The clamping device of claim 1, further comprising a solid lubricant coating disposed along at least a portion of an inner surface of each of the plurality of first segments and along at least a portion of an inner surface of the at least one second segment.

5. The clamping device of claim 1, wherein the clamping device is configured to clamp the conduit to a combustor-can of a gas turbine engine.

6. The clamping device of claim 1, wherein the conduit-facing ends of the plurality of first segments and the at least one second segment is in a cylindrical form having a diameter in a range from about 3 mm to about 5 mm.

7. The clamping device of claim 1, wherein at least one side of each of the plurality of first segments and at least one second segment comprise a plurality of slits spaced apart from each other along the longitudinal axis.

8. A system comprising:
    a combustor-can; and
    an axial fuel staging system coupled to the combustor-can, wherein the axial fuel staging system comprises a fuel injector and a conduit assembly, wherein the conduit assembly comprises a conduit that is clamped to the combustor-can with a clamping device comprising;
    a sheet metal comprising a plurality of first segments and at least one second segment,
    wherein each of the plurality of first segments and the at least one second segment comprise a conduit-facing end and an outwardly-extending end, wherein the conduit-facing ends are joined to each other along a lateral axis of the sheet metal and configured to wrap around the conduit in opposite directions, wherein the outwardly-extending ends of the plurality of first segments extend in an opposite direction to the outwardly-extending end of the at least one second segment, and wherein each of the outwardly-extending ends has an angled portion at a respective bend angle relative to a longitudinal axis of the sheet metal, towards a respective conduit-facing end of a respective one of the plurality of first segments or the at least one second segment;
    a plurality of wedge-washers, wherein at least one wedge-washer is disposed on each of the plurality of first segments and the at least one second segment, wherein each of the at least one wedge-washer comprises an angled sidewall inclined along and in contact with the angled portion of a respective outwardly-extending end of each of the plurality of first segments and the at least one second segment; and
    a plurality of fastening members with at least one fastening member disposed on each of the plurality of wedge-washers for applying pressure on the respective wedge-washer along radial and longitudinal axes of the sheet metal and clamp the conduit to the combustor-can.

9. The system of claim 8, wherein the conduit-facing ends of each of the plurality of first segments are coupled to the conduit-facing end of the at least one second segment via a locking pin.

10. The system of claim 8, wherein the conduit-facing ends of each of the plurality of first segments are integrated to the conduit-facing end of the at least one second segment to form a unified conduit-facing end of the sheet metal.

11. The turbine system of claim 8, further comprising a solid lubricant coating disposed along at least a portion of an inner surface of each of the plurality of first segments, along at least a portion of an inner surface of the at least one second segment, and along a portion of an outer surface of the conduit.

12. The system of claim 8, further comprising a mesh wrapped on a portion of an outer surface of the conduit.

13. The turbine system of claim 8, wherein the clamping device has a stiffness in a range from about 1000 N/mm to about 100000 N/mm.

14. The system of claim 8, comprising a gas turbine engine having the combustor-can, a turbine, and the axial fuel staging system.

15. The turbine system of claim 8, wherein the conduit-facing ends of the plurality of first segments and the at least one second segment is in a cylindrical form having a diameter in a range from about 3 mm to about 5 mm.

16. The system of claim 8, wherein at least one side of each of the plurality of first segments and at least one second segment comprise a plurality of slits spaced apart from each other along the longitudinal axis.

17. The system of claim 8, wherein the at least one wedge-washer has a hole and the combustor-can has an elongated hole and wherein the at least one fastening member is inserted through the hole and the elongated hole.

18. The system of claim 8, wherein the at least one wedge-washer has a hole, the combustor-can has a first elongated hole, and at least one of the plurality of first segments and the at least one second segment has a second elongated hole and wherein the at least one fastening member is inserted through the hole, the first elongated hole, and the second elongated hole.

19. A method for clamping at least one conduit in a position, comprising:
    obtaining a sheet metal comprising a plurality of first segments and at least one second segment,
    wherein each of the plurality of first segments and the at least one second segment comprise a conduit-facing end, and an outwardly-extending end and wherein the conduit-facing ends are joined to each other along a lateral axis of the sheet metal;
    adjusting the sheet metal so that the conduit-facing ends of each of the plurality of first segments and the at least one second segment of the sheet metal wrap around the conduit in opposite directions;
    adjusting the outwardly-extending ends of the plurality of first segments extend in an opposite direction to the outwardly-extending end of the at least one second segment;
    bending the sheet metal so that each of the outwardly-extending ends has an angled portion at a respective bend angle relative to a longitudinal axis of the sheet metal, towards a respective conduit-facing end of a respective one of the plurality of first segments or the at least one second segment;
    assembling such that at least one wedge-washer of a plurality of wedge-washers is disposed on each of the plurality of first segments and the at least one second segment such that an angled sidewall of each of the at least one wedge-washer is inclined along and in contact with the angled portion of a respective outwardly-extending end of each of the plurality of first segments and the at least one second segment; and
    assembling such that at least one fastening member of a plurality of fastening members is disposed on each of the plurality of wedge-washers for applying pressure on the respective wedge-washer along radial and longitudinal axes of the sheet metal.

20. The method of claim 19, wherein assembling such that the at least one fastening member disposed on each of the plurality of wedge-washers for applying pressure on the respective wedge-washer comprises pushing the outwardly-extending ends of each of the plurality of first segments in a first direction along the longitudinal axis and the outwardly-extending end of the at least one second segment in a second direction along the longitudinal axis, wherein the first direction is opposite to the second direction.

* * * * *